United States Patent
Goto

(10) Patent No.: US 8,163,413 B2
(45) Date of Patent: Apr. 24, 2012

(54) ELECTRONIC APPARATUS

(75) Inventor: Katsuichi Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 12/337,116

(22) Filed: Dec. 17, 2008

(65) Prior Publication Data

US 2009/0169981 A1 Jul. 2, 2009

(30) Foreign Application Priority Data

Dec. 28, 2007 (JP) ................................. 2007-339259

(51) Int. Cl.
*H01M 2/10* (2006.01)
*G06F 1/18* (2006.01)
*G06F 1/26* (2006.01)

(52) U.S. Cl. ........ 429/96; 429/99; 429/123; 361/679.55
(58) Field of Classification Search ........................ None
See application file for complete search history.

(56) References Cited

U.S. PATENT DOCUMENTS

| 6,287,140 | B1* | 9/2001 | Itoh ............................... 439/500 |
| 2005/0136320 | A1* | 6/2005 | Yajima et al. .................... 429/61 |
| 2007/0278820 | A1 | 12/2007 | Habering et al. | |

FOREIGN PATENT DOCUMENTS

| JP | 55-162989 | 11/1980 |
| JP | 5-57891 | 7/1993 |
| JP | 8-328697 | 12/1996 |
| JP | 2000-010657 | 1/2000 |
| JP | 2006-059689 | 3/2006 |
| JP | 2007-529354 | 10/2007 |
| WO | 2005/090825 | 9/2005 |

OTHER PUBLICATIONS

Machine translation of JP 2006-59689, Mar. 2006.*
Office Action issued in corresponding Japanese Patent Application No. 2007-339259 dated Oct. 20, 2009.

* cited by examiner

*Primary Examiner* — Jonathan Crepeau
(74) *Attorney, Agent, or Firm* — Staas & Halsey LLP

(57) ABSTRACT

An electronic apparatus has a battery pack and a main unit. The battery pack has a groove formed in an outer surface of the battery pack, the groove being recessed from the outer surface and extending in a predetermined direction. The main unit comprises a container portion containing the battery pack in a removable manner and having a projection engaged to the groove of the battery pack loaded in the container portion, and a cable disposed in an internal space of the projection.

11 Claims, 37 Drawing Sheets

ELECTRONIC APPARATUS

CROSS-REFERENCE TO RELATED APPLICATIONS

This application is based upon and claims the benefit of priority from the prior Japanese Patent Application No. 2007-339259 filed on Dec. 28, 2007, the entire contents of which are incorporated herein by reference.

BACKGROUND

Field

Recently, portable electronic apparatuses which have displays for displaying information, such cell phones and lap top personal computers, have been widely used. A further reduction of size and weight of the apparatus is keenly demanded, in addition to higher-speed processing and more versatile functions in those portable electronic apparatuses. To satisfy such a demand, the portable electronic apparatus employs a display using a thin and light-weight liquid crystal panel. Further, development of electronic components incorporated in the electronic apparatus is progressing so as to provide smaller sizes and higher performances.

The electronic apparatus contains a plurality of electronic components, such as a CPU, a hard disk drive, a drive for a recording medium, a speaker, a microphone, and a communication antenna. Those plural electronic components are interconnected through cables. With the electronic apparatus having more versatile functions, the number of electronic components incorporated in the electronic apparatus has increased. Therefore, many cables are complicatedly wired inside the electronic apparatus. This may lead to a possibility that when the electronic apparatus is repaired, for example, one or more cables are caught on circuit boards, frames within a housing, etc. and are disconnected. If the cable is disconnected or damaged, a worker has to take efforts and time to specify the location where trouble has occurred.

In order to avoid the above-mentioned problem, the electronic apparatus is generally designed such that grooves and/or ribs used for wiring cables are provided within a main unit housing and the cables are fixedly held within the main unit housing with the aid of the grooves and/or the ribs. As described above, however, the electronic apparatus is required to incorporate an increased number of electronic components while further downsizing of the electronic apparatus is realized. Therefore, the electronic apparatus has a difficulty in preparing a space necessary to provide the grooves and/or the ribs for the cable wiring within the housing.

In the known related art regarding an apparatus for withdrawing a unit from a housing with the aid of a slide rail attached to a lateral surface of the unit, signal lines for the unit are contained in the slide rail.

As described above, the electronic apparatus is required to incorporate an increased number of electronic components while further downsizing of the electronic apparatus is realized. Therefore, the electronic apparatus has a difficulty in preparing a space necessary to provide the grooves and/or the ribs for the cable wiring within the housing.

SUMMARY

The disclosed electronic apparatus comprises a battery pack having a groove formed in an outer surface of the battery pack, the groove being recessed from the outer surface and extending in a predetermined direction; and a main unit comprising a container portion containing the battery pack in a removable manner and having a projection engaged to the groove of the battery pack loaded in the container portion, and a cable disposed in an internal space of the projection.

Additional aspects and/or advantages will be set forth in part in the description which follows and, in part, will be apparent from the description, or may be learned by practice of the invention.

The above-described embodiments of the present invention are intended as examples, and all embodiments of the present invention are not limited to including the features described above.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
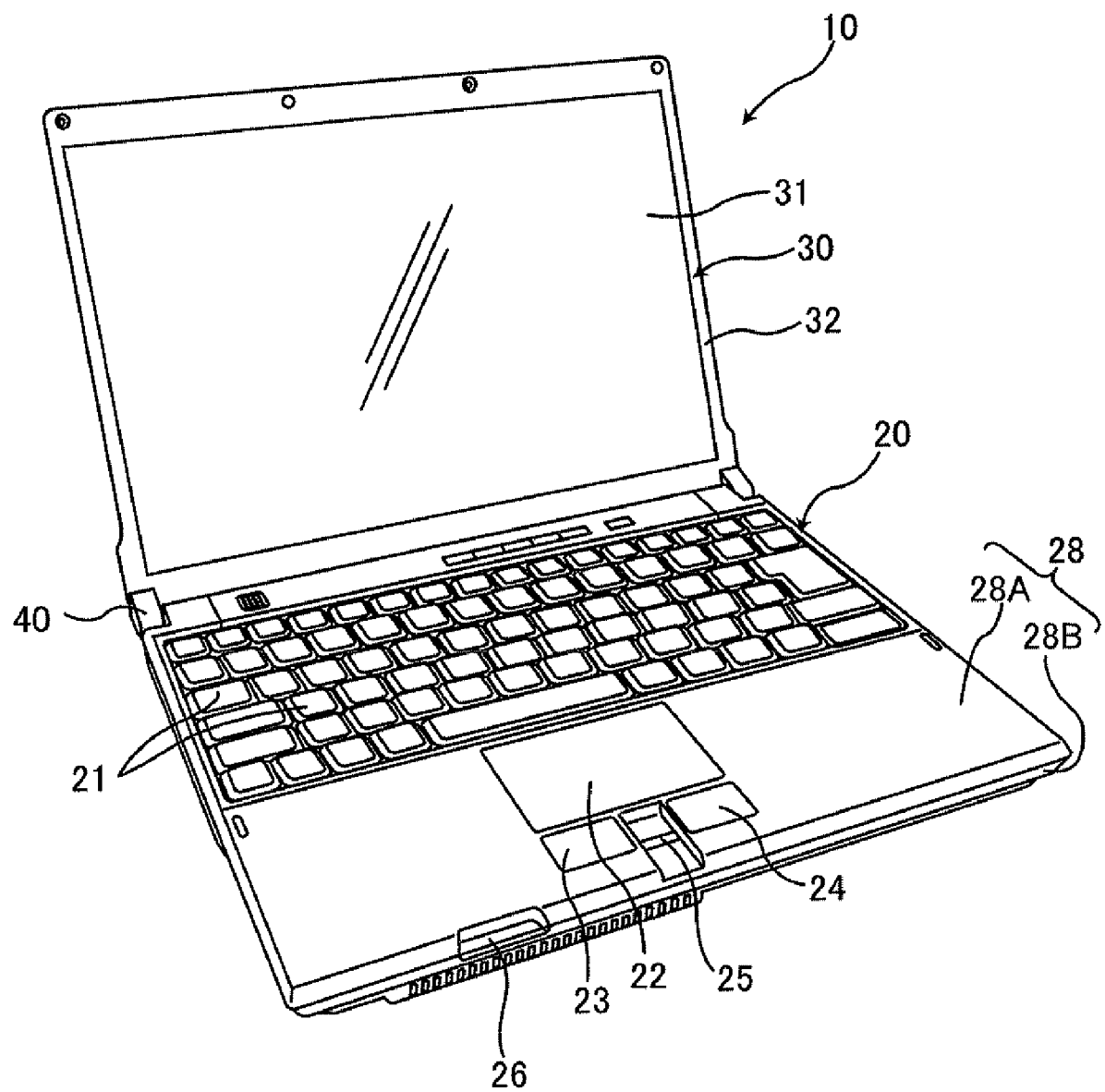
FIG. 1 is an external appearance view of a personal computer according to a first embodiment as a practical example of an electronic apparatus.

Reference may now be made in detail to embodiments of the present invention, examples of which are illustrated in the accompanying drawings, wherein like reference numerals refer to like elements throughout.

Concrete embodiments regarding a basic form and application forms will be described below with reference to the drawings.

FIG. 1 is an external appearance view of a personal computer 10 according to a first embodiment as a practical example of an electronic apparatus.

The personal computer 10 comprises a main unit 20 and a display unit 30. The display unit 30 is coupled to the main unit 20 through a hinge 40 such that the display unit 30 can be freely opened and closed. The main unit 20 corresponds to one example of a "main unit" in this embodiment. The display unit 30 corresponds to one example of a "display unit" in this embodiment. The hinge 40 corresponds to one example of a "coupling portion" in this embodiment. FIG. 1 shows the personal computer 10 from the front side in the state where the display unit 30 is opened.

The main unit 20 serves to execute various kinds of information processing. A main unit housing 28 contains a CPU, a hard disk drive, etc. therein. The main unit housing 28 has an upper case 28A and a lower case 28B, which are each made of a metal with a high strength. The upper case 28A comprises, on its upper surface, a keyboard having a plurality of arrayed keys 21, a track pad 22, a left click button 23, a right clock button 24, etc. Further, the upper case 28A comprises, in its front portion, a fingerprint sensor 25 for performing fingerprint identification when a user's finger is placed, and a medium loading port 26 into which a small sized recording medium is loaded.

The display unit 30 serves to display the result of information processing executed in the main unit 20. A display housing 32 contains therein a thin liquid crystal panel, a control circuit for the liquid crystal panel, an antenna for communication, etc. The display housing 32 has a front cover 32A and a rear cover 32B (see FIG. 2). The liquid crystal panel is sandwiched between the front cover 32A and the rear cover 32B from the front and rear sides, respectively, with a display screen 31 positioned on the front side. The display unit 30 is a wide-type display in which various electronic components are disposed on the backside of the liquid crystal panel such that the display screen 31 is widened up to near lateral surfaces of the display housing 32.

Figure 2:
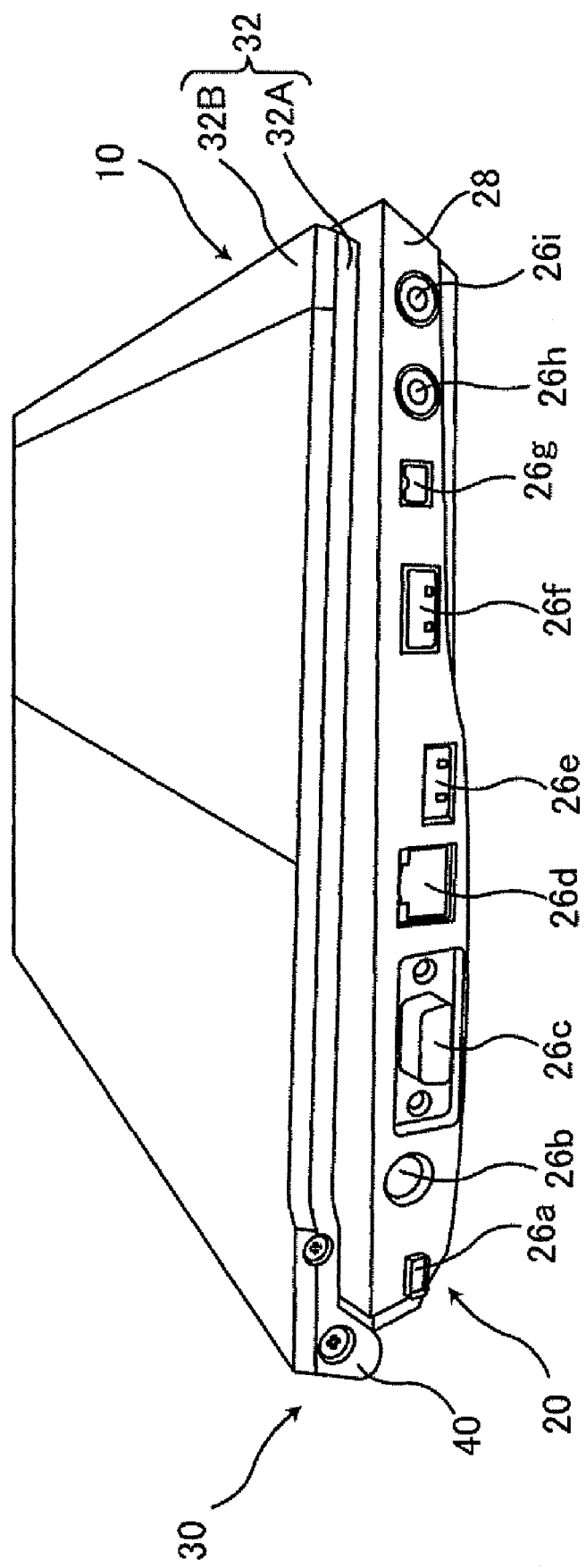
FIG. 2 shows one lateral surface of the personal computer.

FIG. 2 shows one lateral surface of the personal computer 100.

The main unit 20 comprises, in the one lateral surface, a security slot 26a for a wire cable lock, a connector 26b for a power supply module, a connector 26c for an external monitor, a connector 26d for a LAN cable, USB connectors 26e and 26f, a connector 26g for an audio jack, a connector 26h for a microphone, a connector 26i for a headphone, etc.

Figure 3:
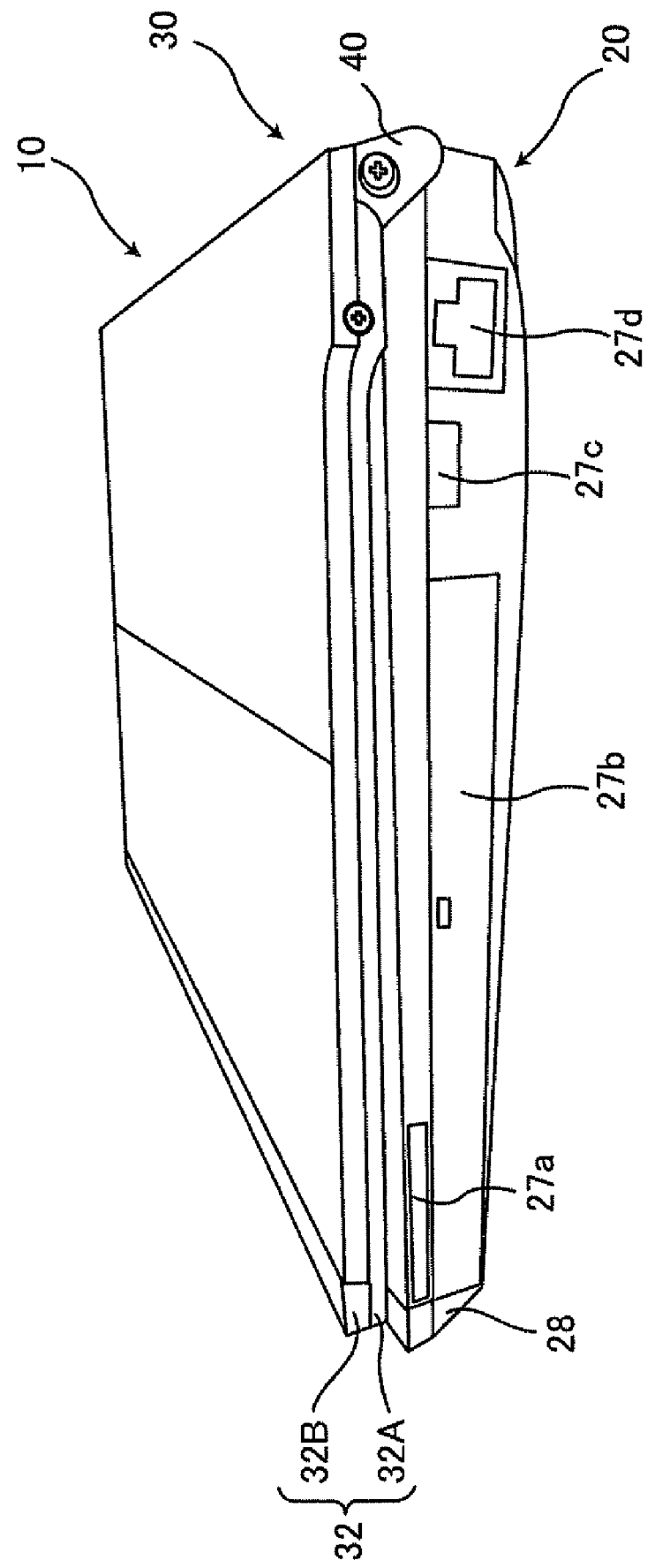
FIG. 3 shows the other lateral surface of the personal computer on the side opposite to the one lateral surface which is viewed in FIG. 2.

FIG. 3 shows the other lateral surface of the personal computer 10 on the side opposite to the one lateral surface which is viewed in FIG. 2;

The main unit 20 comprises, in the other lateral surface opposite to the one lateral surface viewed in FIG. 2, an expansion card loading port 27a, an optical disk loading port 27b, a USB connector 27c, and a modem connector 27d. An expansion card for expanding the functions of the personal computer, such as a LAN card, is loaded into the expansion card loading port 27a. An optical disk, such as a CD or a DVD, is loaded into the optical disk loading port 27b.

Figure 4:
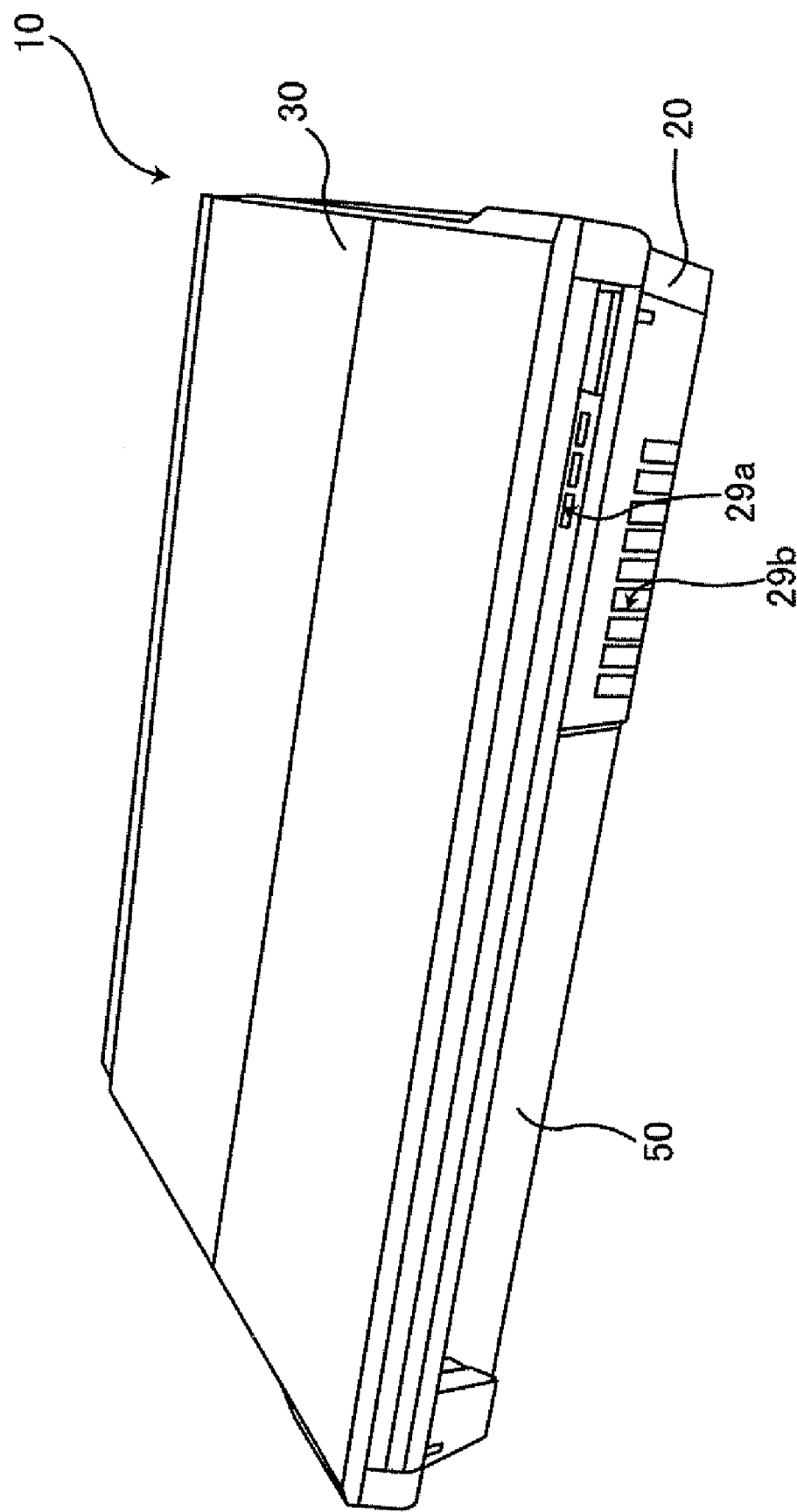
FIG. 4 shows the personal computer from the rear side.

FIG. 4 shows the personal computer 10 from the rear side.

The personal computer 10 comprises, in its rear surface, intake openings 29a and exhaust openings 29b. The intake openings 29a and the exhaust openings 29b constitute a cooling mechanism for radiating heat generated from various electronic components. The intake openings 29a are disposed above the exhaust openings 29b. With such an arrangement, heat accumulated near the bottom of the personal computer 10 is prevented from being taken in through the intake openings 29a. As a result, the personal computer can maintain sufficient heat radiation efficiency even when it is continuously used. Further, a battery pack 50 for supplying electric power is loaded in the main unit 20. The battery pack 50 corresponds to one example of a "battery pack" in this embodiment.

Figure 5:
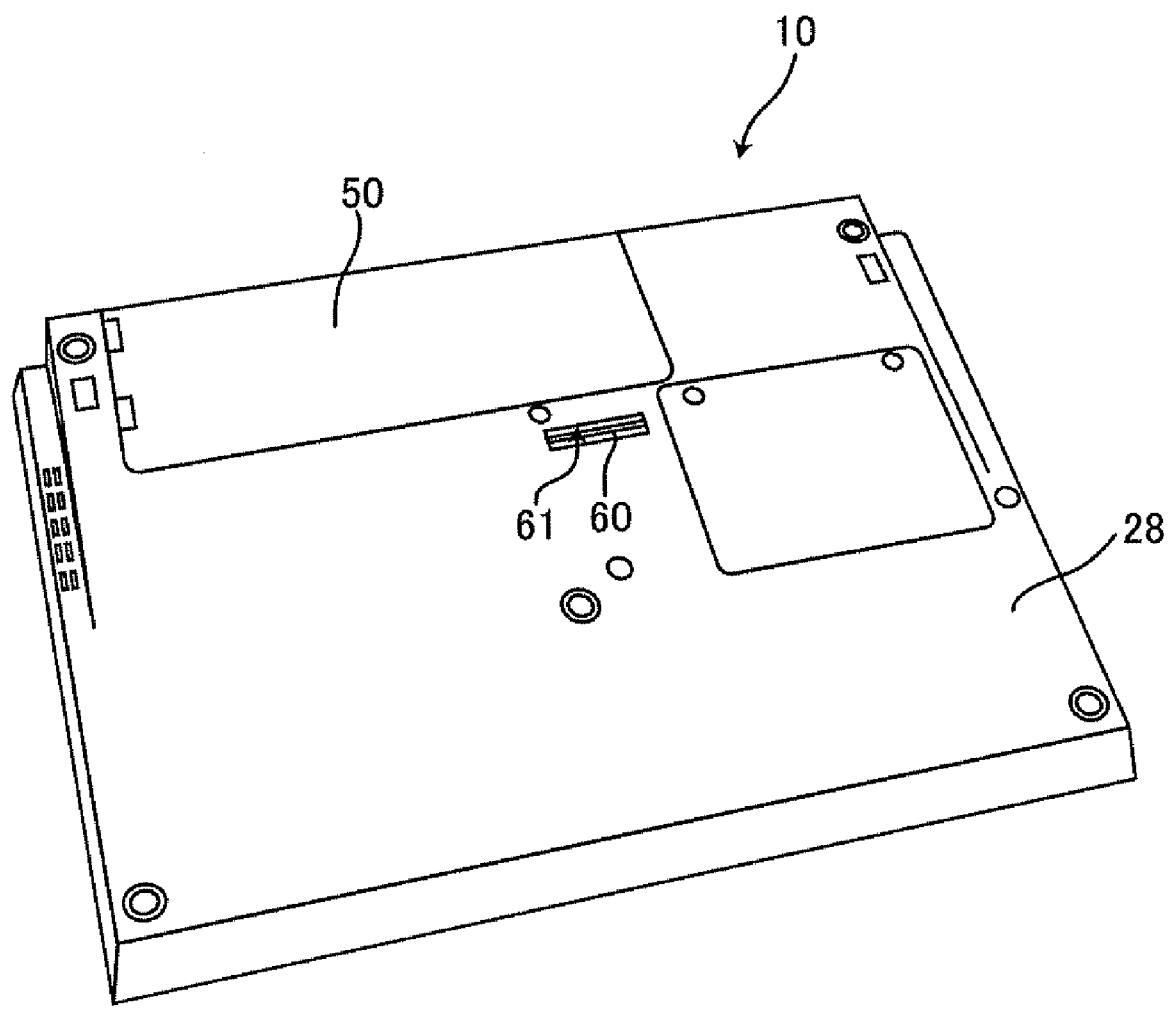
FIG. 5 shows the personal computer from the bottom side.

FIG. 5 shows the personal computer 10 from the bottom side.

The personal computer 10 of this embodiment comprises a connector for connection with a peripheral device, such as a printer, and a hard disk drive for expansion. A port replicator for expanding the functions of the personal computer 10 is connectable to the personal computer 10. In the personal computer 10, the battery pack 50, shown in FIG. 5, is externally exposed at a bottom surface of the personal computer 10. An expansion connector 60 connected to a connector of the port replicator is externally exposed via a through-hole 61 which is formed in the main unit housing 28.

The internal configuration of the personal computer 10 will be next described.

Figure 6:
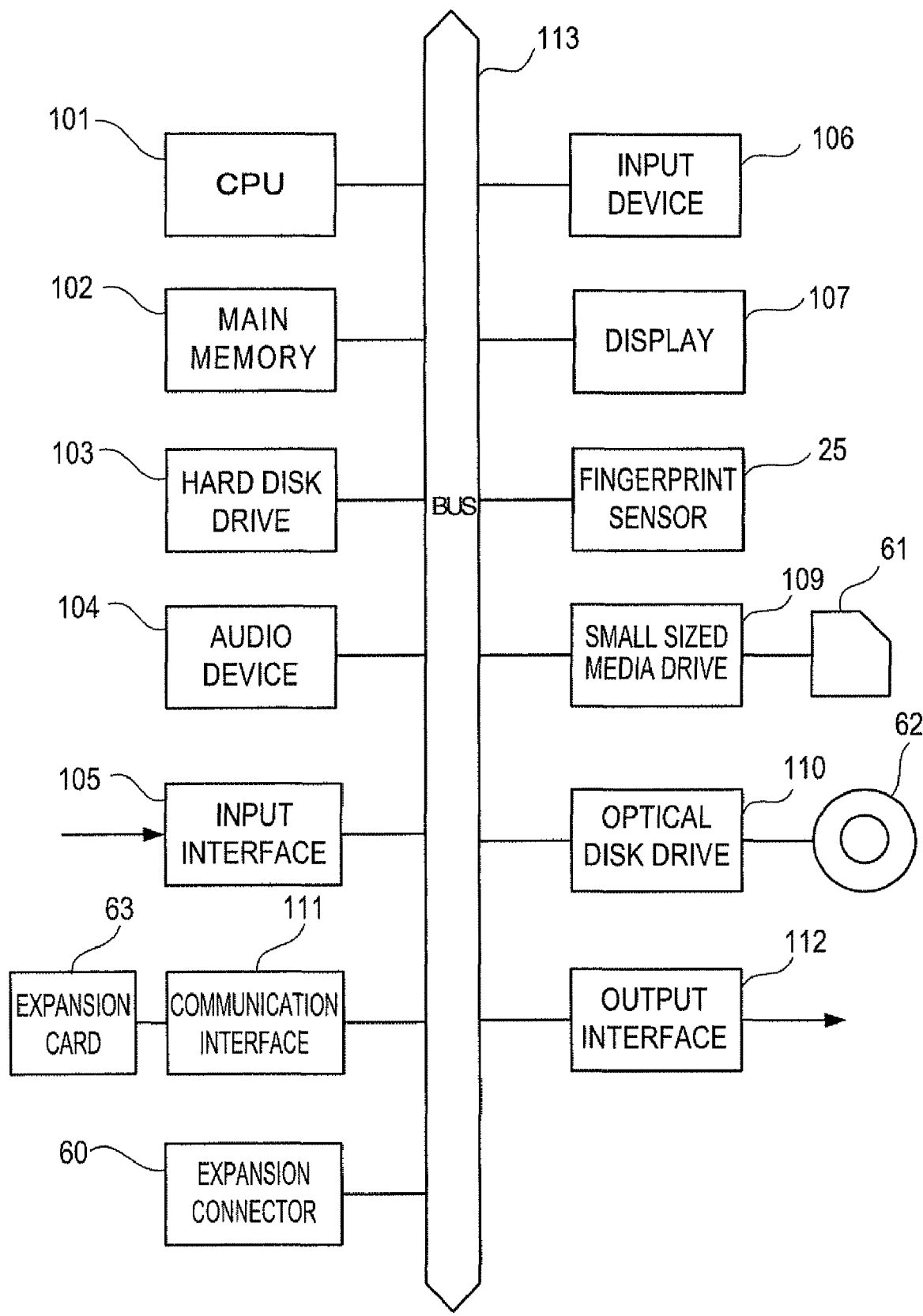
FIG. 6 is a block diagram showing the internal configuration of the personal computer.

FIG. 6 is a block diagram showing the internal configuration of the personal computer 10.

The personal computer 10 incorporates, as shown in FIG. 6, a CPU 101, a main memory 102, a hard disk drive 103, an audio device 104, an input interface 105, an input device 106, a display 107, the above-mentioned fingerprint sensor 25, a small sized media drive 109, an optical disk drive 110, a communication interface 111, an output interface 112, the above-mentioned expansion connector 60, etc. The CPU 101 executes various programs. The main memory 102 is a storage device in which a program read from the hard disk drive 103 is developed to be executed by the CPU. The hard disk drive 103 stores various programs and data, etc. The audio device 104 incorporates a microphone, a speaker, etc. The input interface 105 enables data to be input from an external device. The input device 106 comprises the keyboard, the track pad 22, etc. The display 107 displays information on the display screen 31. The small sized media drive 109 accesses a small sized recording medium 261 loaded in place. The optical disk drive 110 accesses a CD-ROM 62 or a DVD loaded in place. The communication interface 111 serves to perform communication using the expansion card 63. The output interface 112 enables data to be output to an external device. Those various elements are interconnected via a bus 113.

The personal computer 10 of this embodiment comprises various contrivances for realizing a reduction in size and weight of the personal computer and an improvement in impact resistance thereof. First, the contrivances for reducing the size and the weight of the main unit 20 will be described below.

Figure 7:
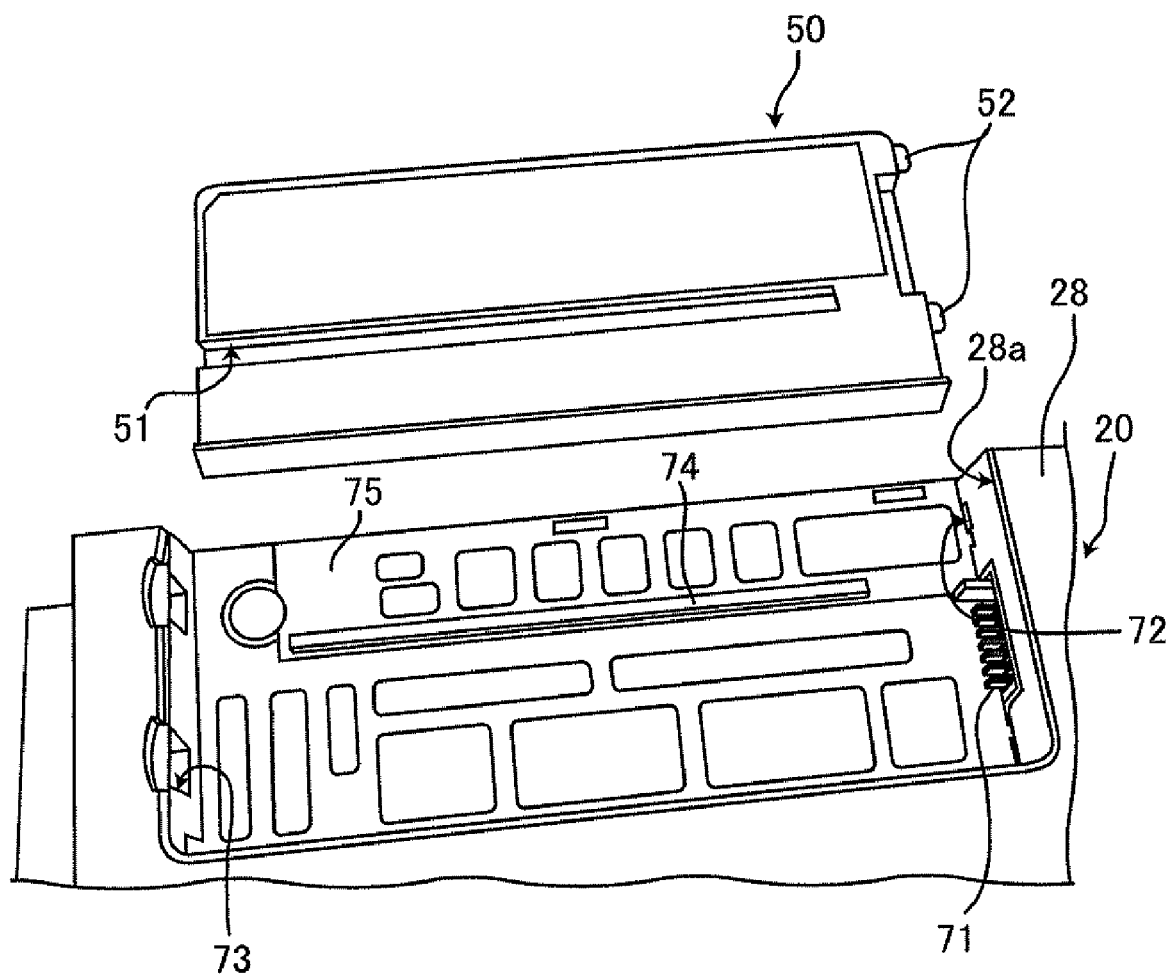
FIG. 7 shows a bottom surface of the personal computer when a battery pack is removed.

FIG. 7 shows a bottom surface of the personal computer 10 when the battery pack 50 is removed.

The lower case 28B of the main unit housing 28 has a cutout 28a extending from the backside to the bottom surface of the personal computer 10. In the state where the battery pack 50 is removed from the main unit housing 28, a partition plate 75 is externally exposed on the lower surface side. The keyboard having the plurality of arrayed keys 21, etc. are mounted to an upper surface of the partition plate 75. A space formed by the cutout 28a corresponds to one example of a "container portion" in this embodiment.

The battery pack 50 has a groove 51 extending in a longitudinal direction in its surface positioned to face the main unit housing 28. Further, the battery pack 50 has projections 52 formed on its lateral surface. The groove 51 corresponds to one example of a "groove of a battery pack" in this embodiment.

The main unit housing 28 has a projection 74 which is provided on a lower surface of the partition plate 75 and which is fitted into the groove 51 of the battery pack 50. The cutout 28a comprises a power input terminal 71 and recesses 72 formed in one lateral surface thereof. The power input terminal 71 serves to input electric power from the battery pack 50. The projections 52 of the battery pack 50 are inserted into the recesses 72. Further, the cutout 28a comprises recesses 73 formed in the other lateral surface thereof. Pawls 54 (see FIG. 10) provided on the battery pack 50 are fitted into the recesses 73.

With the projection 74 of the main unit housing 28 fitted into the groove 51 of the battery pack 50, the battery pack 50 is easily positioned with respect to the main unit housing 28. As a result, false loading of the battery pack 50 into the main unit housing 28 can be avoided and the occurrence of wobbling (rattling) of the battery pack 50 in the loaded state can be suppressed. The projection 74 corresponds to one example of a "projection fitted into the groove of the battery pack" in this embodiment.

Figure 8:
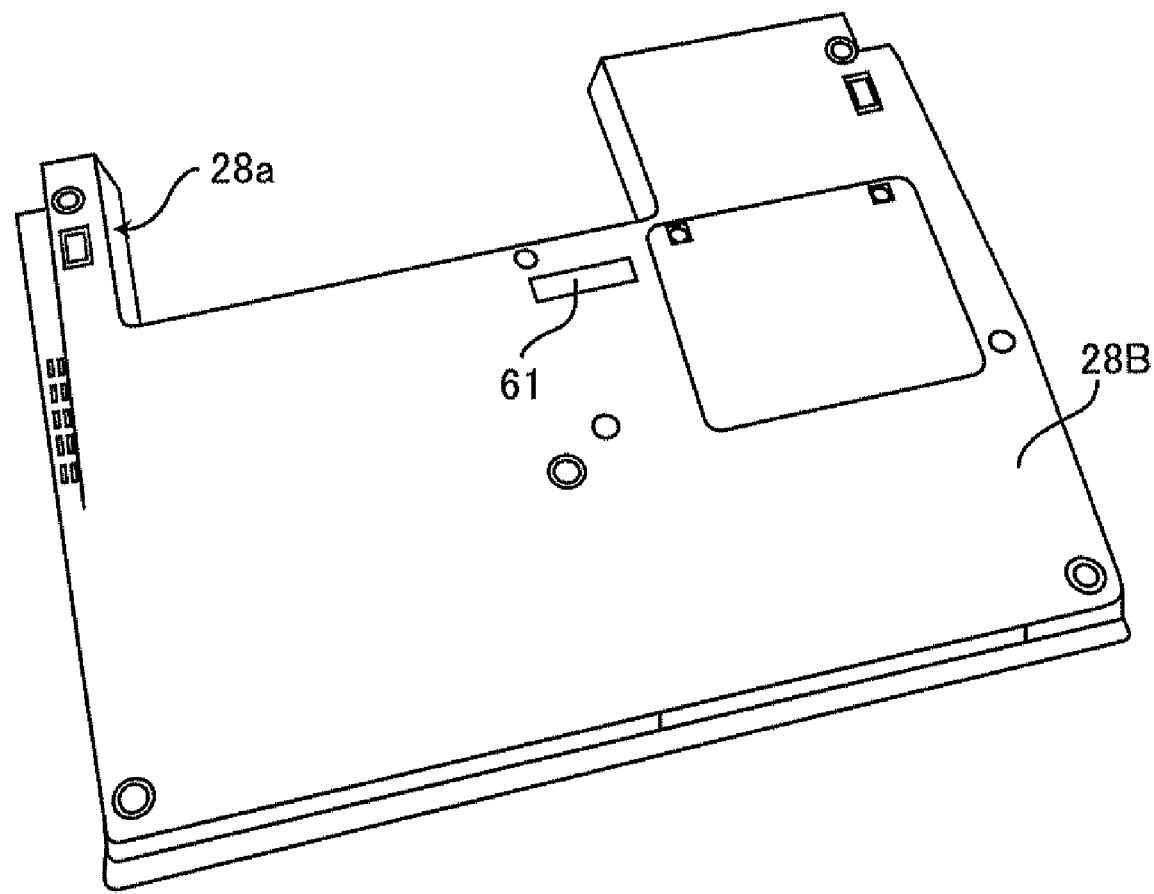
FIG. 8 shows a lower case from the bottom side in the state where the battery pack is removed.

FIG. 8 shows the lower case 28B from the bottom side in the state where the battery pack 50 is removed.

The lower case 28B has the cutout 28a. In the state where the battery pack 50 is fitted to the cutout 28a, a bottom surface and one lateral surface of the battery pack 50 are externally exposed at outer surfaces of the personal computer 10. With such a structure making a part of the battery pack 50 externally exposed at the outer surfaces of the personal computer 10, walls of the main unit housing 28 can be omitted which are otherwise required to cover the space corresponding to the cutout 28a. Hence, the size and the weight of the main unit can be reduced.

Figure 9:
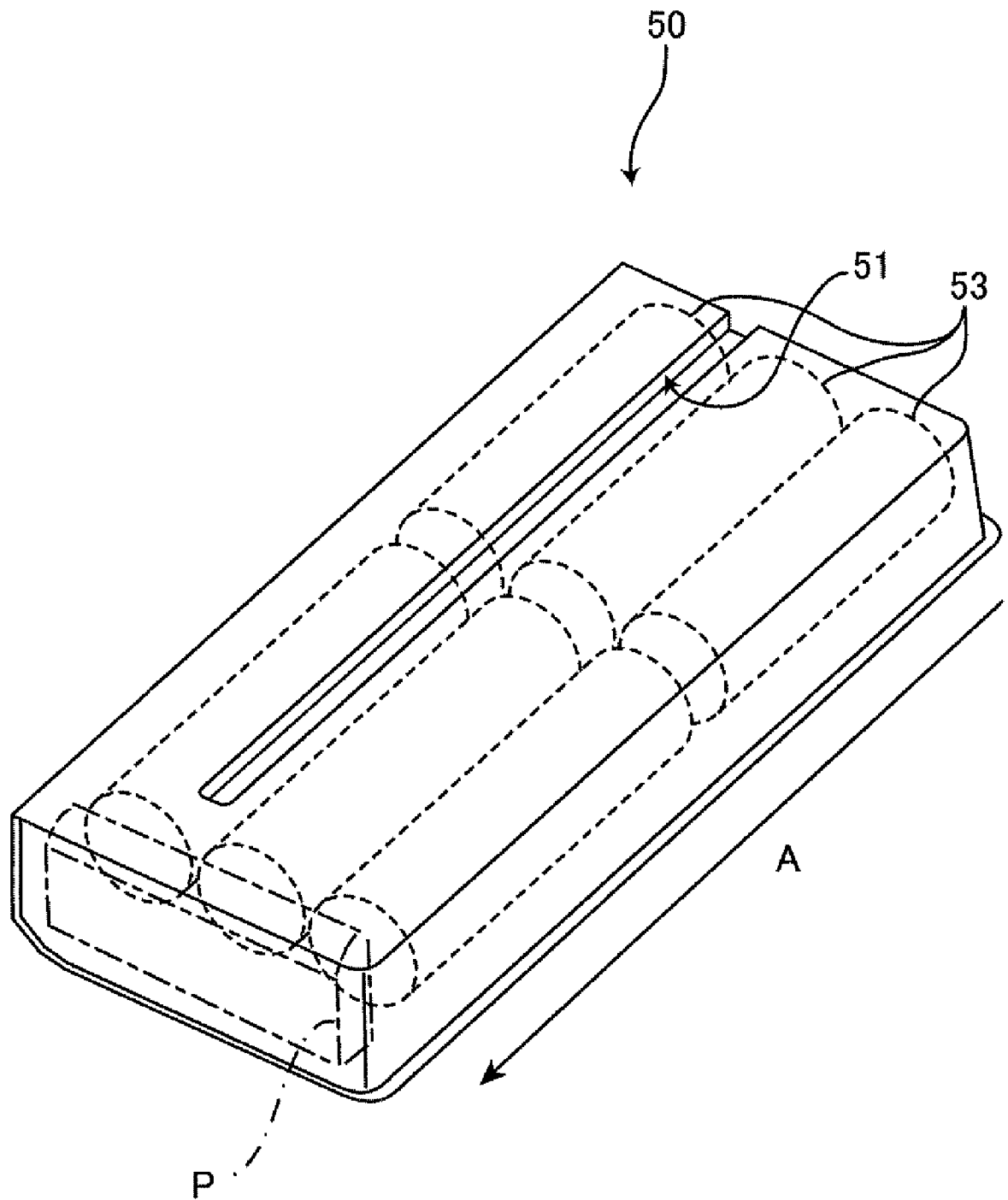
FIG. 9 is a perspective view of the battery pack, the view showing the interior in a seeing-through way.

FIG. 9 is a perspective view of the battery pack, the view showing the interior in a seeing-through way.

As shown in FIG. 9, the battery pack 50 contains a plurality of cylindrical cells 53 which are arranged with their central axes aligned in the direction of arrow A. The cell 53 corresponds to one example of a "cell" in this embodiment. In the battery pack 50, a gap is formed between two adjacent rows of the cells 53. The battery pack 50 has the groove 51 formed in its outer surface to be recessed into the gap. Stated another way, in this embodiment, the groove 51 is formed by utilizing the gap formed between two adjacent rows of the cells 53. Therefore, the groove 51 can be provided as a sufficiently deep and long groove without increasing the size of the battery pack.

The groove 51 serves to positively avoid the battery pack 50 from wobbling. Further, one end of the groove 51 is terminated midway in the outer surface of the battery pack 50. Electronic components, such as a power output terminal 55 (see FIG. 11) and a circuit board, are contained in an internal space P of the battery pack 50 on the same side as the one end of the groove 51. Meanwhile, the groove 51 is extended on the other end side up to one lateral surface of the battery pack 50 such that the groove 51 has a larger length than the projection 74 shown in FIG. 7. Thus, in this embodiment, since the groove 51 is extended up to one edge of the battery pack 50, the battery pack 50 can be more easily loaded into the main unit housing 28. Further, in this embodiment, since an area over which the battery pack 50 and the main unit housing 28 are engaged with each other is increased, the battery pack 50 can be positively avoided from wobbling.

Figure 10:
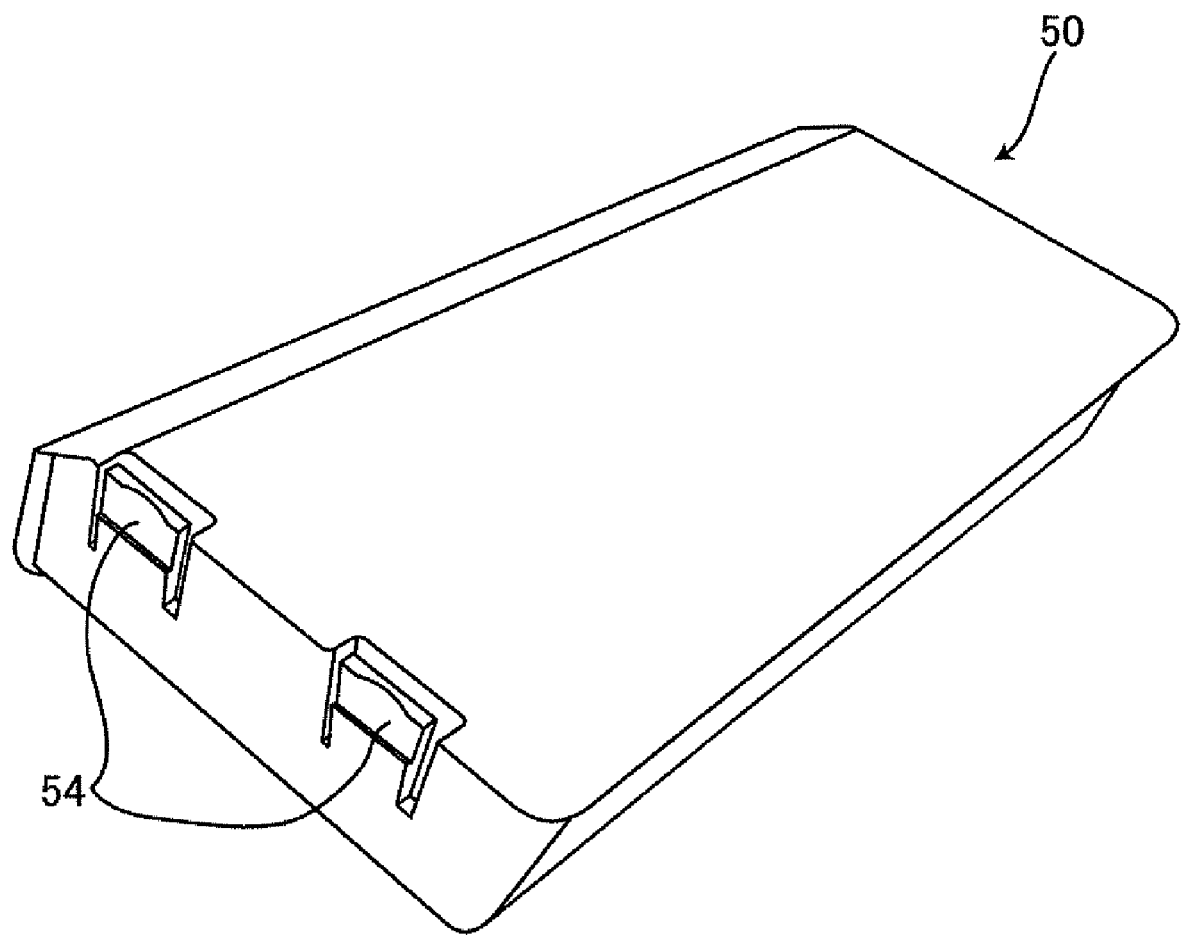
FIG. 10 shows one lateral surface of the battery pack.
Figure 11:
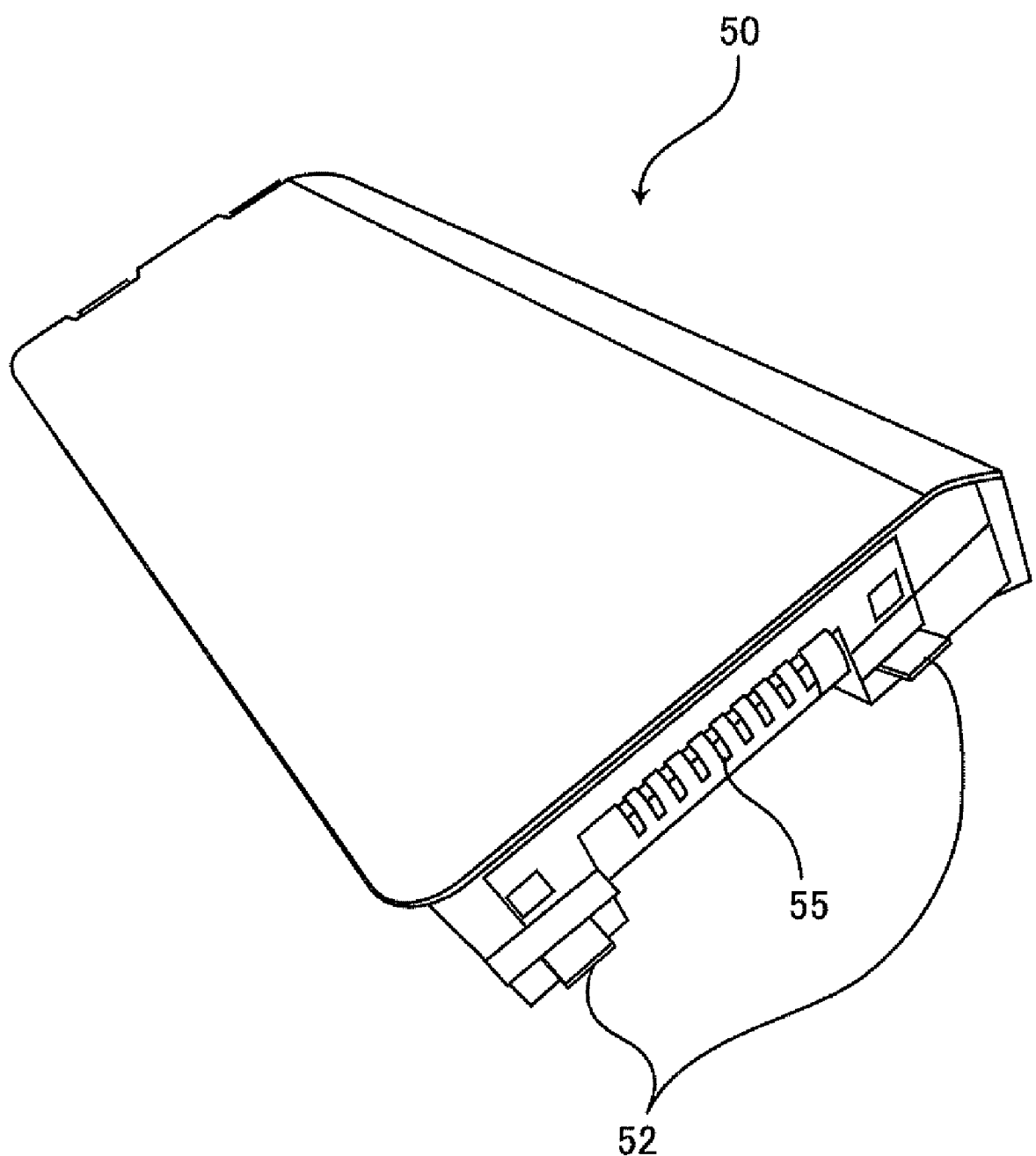
FIG. 11 shows the other lateral surface of the battery pack on the side opposite to the one lateral surface which is viewed in FIG. 10.

FIG. 10 shows one lateral surface of the battery pack, and FIG. 11 shows the other lateral surface of the battery pack on the side opposite to the one lateral surface which is viewed in FIG. 10.

As shown in FIG. 10, the battery pack 50 has the pawls 54 on its one lateral surface. The pawls 54 are fitted into the recesses 73 shown in FIG. 7. As shown in FIG. 11, the battery pack 50 has the power output terminal 55 and the projections 52 on the other lateral surface thereof on the side opposite to the one lateral surface which is viewed in FIG. 10. The power output terminal 55 is connected to the power input terminal 71, shown in FIG. 7, for outputting electric power to the personal computer 10. The projections 52 are inserted into the recesses 72 of the main unit housing 28.

The power output terminal 55 corresponds to one example of a "power output terminal" in this embodiment. The projection 52 corresponds to one example of a "projection provided on the battery pack" in this embodiment. The pawl 54 corresponds to one example of a "resilient latch pawl" in this embodiment. The pawls 54 and the projections 52 are provided on the lateral surfaces of the battery pack 50, each of which has a relatively small area, such that the battery pack 50 is fixed at both the longitudinal ends thereof to the main unit housing 28. As a result, the battery pack 50 is positively fixed to the main unit housing 28.

According to this embodiment, as described above, the battery pack 50 can be properly loaded while an increase in the size and the weight of the personal computer is suppressed. Further, according to this embodiment, the battery pack 50 can be positively avoided from wobbling and slipping off after it has been loaded in place.

The contrivance for reducing the size and the weight of the personal computer on the upper surface side of the partition plate 75, shown in FIG. 7, will be described below.

Figure 12:
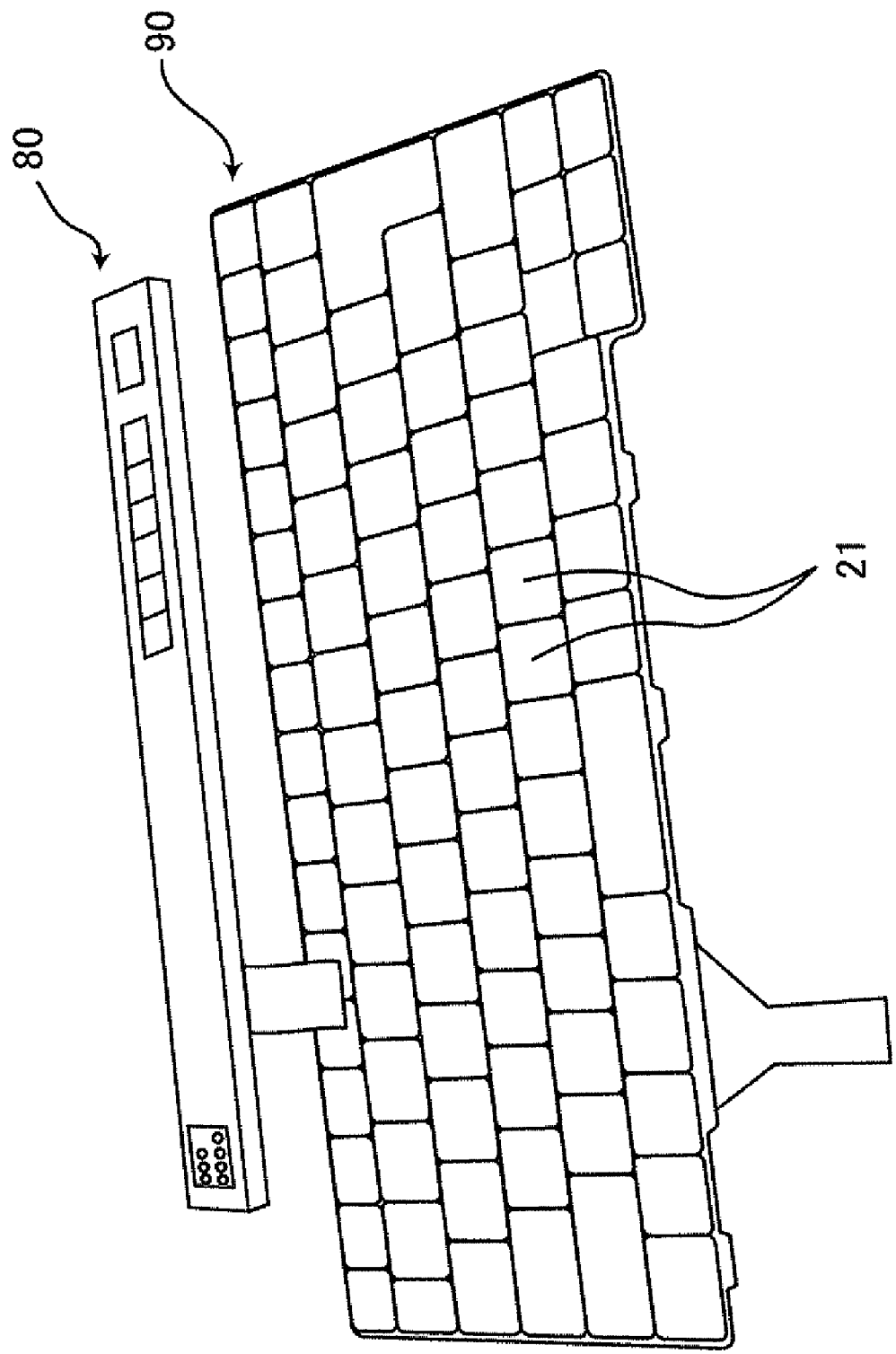
FIG. 12 shows a keyboard and an input device board which are installed on an upper surface of a partition plate.

FIG. 12 shows the keyboard and the input device board which are installed on the upper surface of the partition plate 75.

A keyboard 90 and an input device board 80 are disposed on the upper surface of the partition plate 75. The keyboard 90 comprises the plurality of arrayed keys 21. The input device board 80 comprises various buttons. The input device board 80 and the keyboard 90 correspond to one example of a "first electronic component" in this embodiment. The keyboard 90 also corresponds to one example of a "keyboard" in this embodiment.

Figure 13:
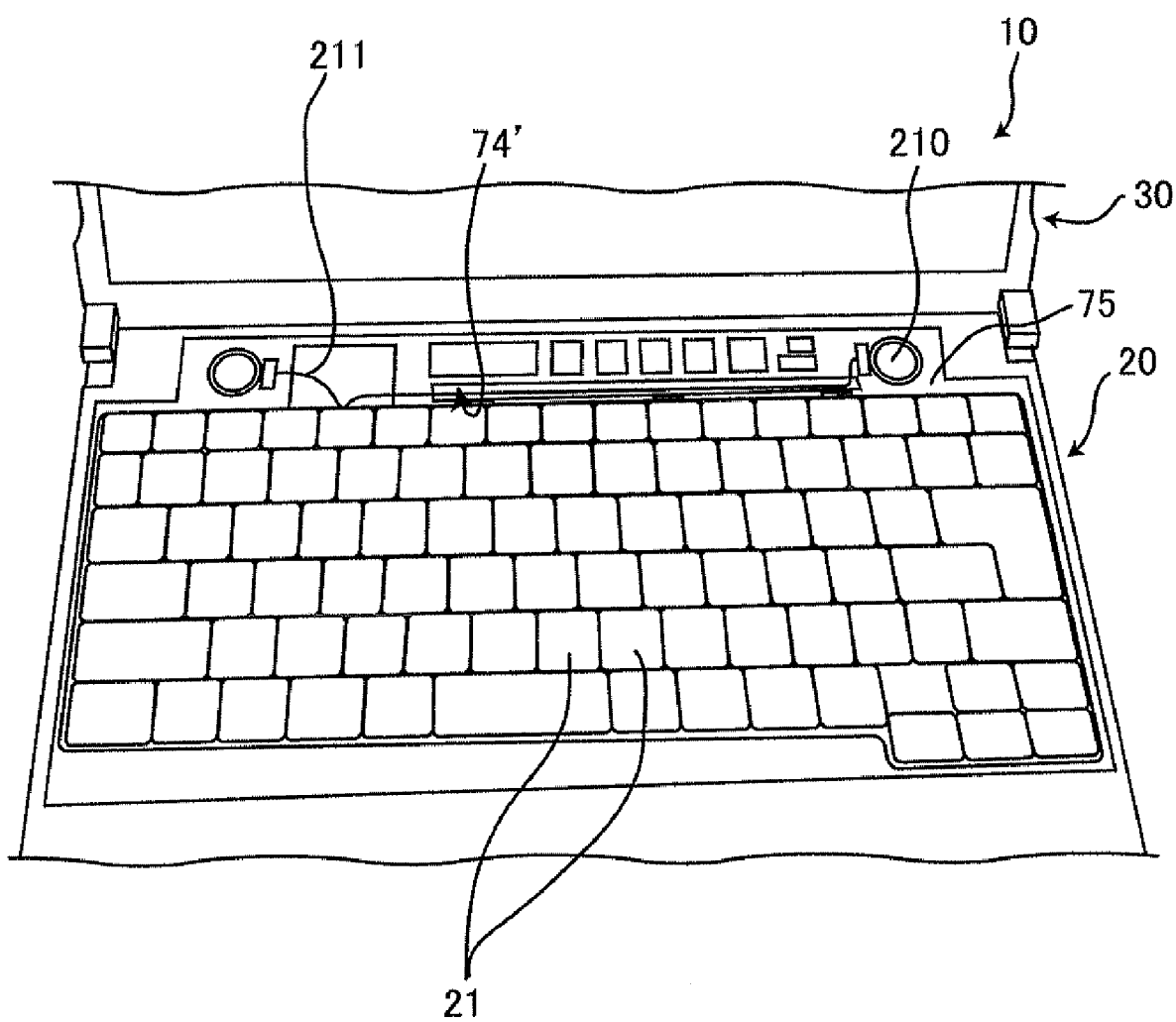
FIG. 13 shows the state where the input device board is removed from the personal computer.
Figure 14:
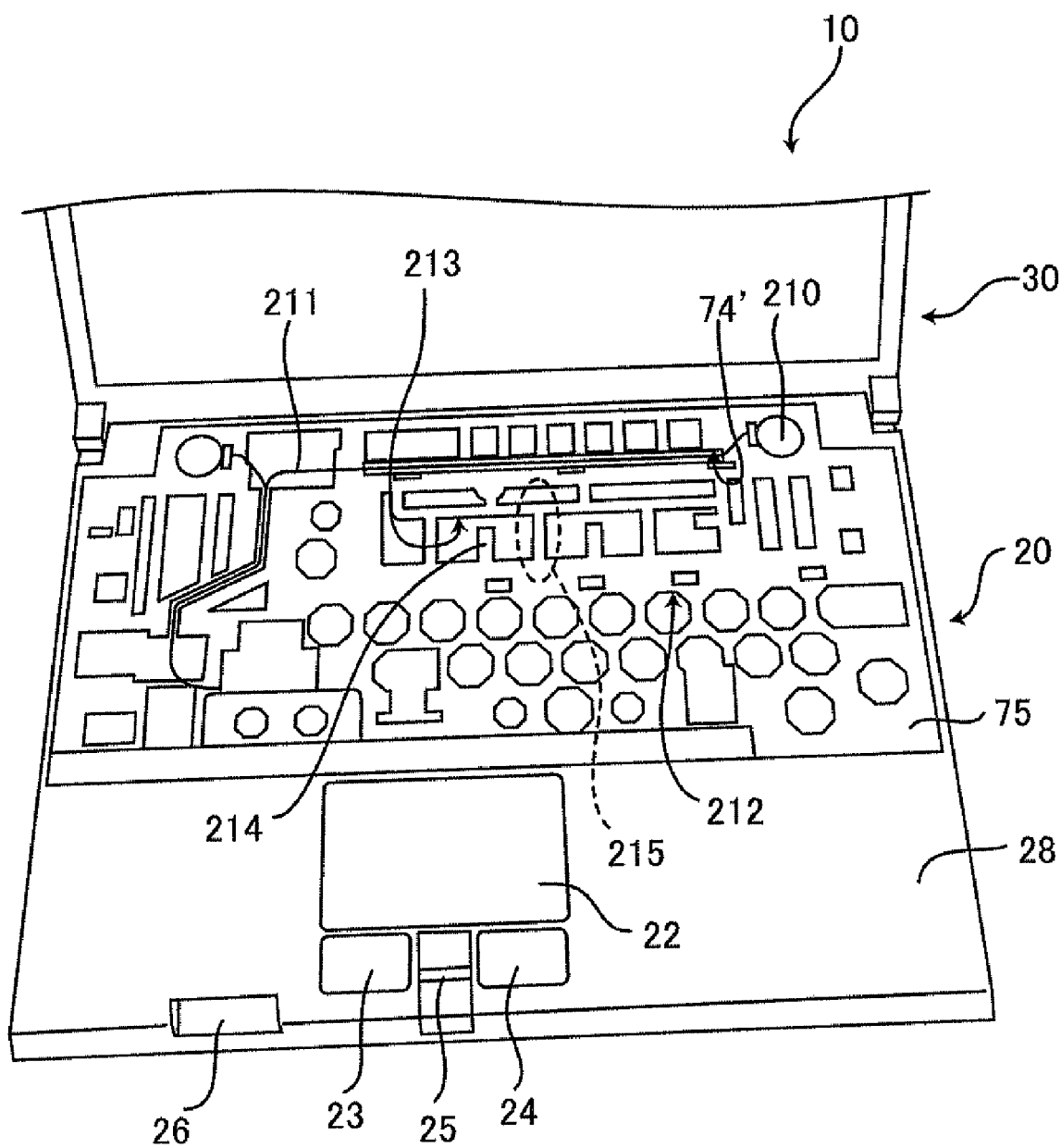
FIG. 14 shows the state where the input device board and the keyboard are removed from the personal computer.

FIG. 13 shows the state where the input device board 80 is removed from the personal computer 10. FIG. 14 shows the state where the input device board 80 and the keyboard 90 are removed from the personal computer 10.

When the input device board 80 and the keyboard 90 are removed from the personal computer 10, the upper surface of the partition plate 75 is externally exposed. A speaker 210 is mounted to the upper surface of the partition plate 75. The speaker 210 is connected to a control circuit (not shown) through a cable 211. The speaker 210 corresponds to one example of a "second electronic component" in this embodiment. The speaker 210 also corresponds to one example of a "speaker" in this embodiment. The projection 74, shown in FIG. 7, is formed by hollowing the partition plate 75 downwards (inwards) from the upper surface side such that a concave portion 74' is formed in the upper surface of the partition plate 75. The concave portion 74' corresponds to one example of a "concave portion forming an internal space" in this embodiment.

Figure 15:
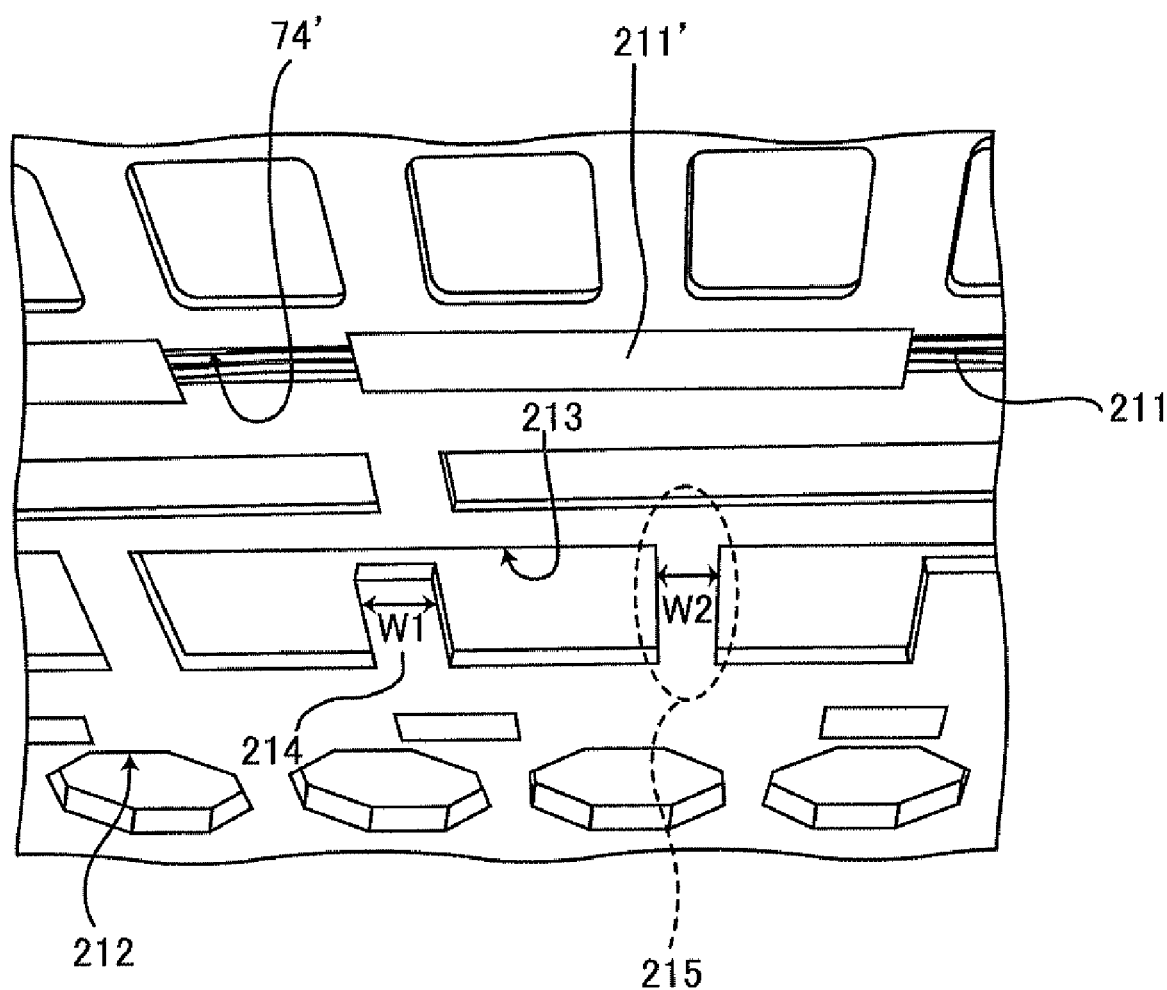
FIG. 15 is an enlarged view of surroundings of a concave portion.

FIG. 15 is an enlarged view of surroundings of the concave portion 74'.

As shown in FIG. 15, the cable 211 connected to the speaker 210 is disposed in the concave portion 74'. The cable 211 is fixedly held in the concave portion 74' by using a tape 211'. Further, as shown in FIGS. 13 and 14, the cable 211 is fixedly held in the concave portion 74' by being covered with the input device board 80 and the keyboard 90. Thus, a space for wiring the cable 211 is positively ensured by utilizing the concave portion 74' in the form of a hollow internal space of the projection 74 with which the battery pack 50 can be loaded in place. In addition, since the projection 74 is hollowed in one surface opposite to the other surface positioned to face the battery pack 50 and the cable 211 is wired in the hollowed space, the cable 211 is positively avoided from being damaged when the battery pack 50 is loaded and unloaded.

According to this embodiment, as described above, an increase in the size and the weight of the personal computer is suppressed by utilizing the internal space of the projection 74 which is used for positioning of the battery pack 50. Further, according to this embodiment, the space for wiring the cable 211 is positively ensured.

In this embodiment, as shown in FIG. 14, a plurality of elastic pieces 214 and holes 213 are formed in the partition plate 75 in an area corresponding to the space where the battery pack 50 is contained. Housing portions 215, which are located between the plurality of holes 213, and the elastic pieces 214 are alternately arranged. The elastic piece 214 corresponds to one example of an "elastic piece" in this embodiment. The housing portion 215 corresponds to one example of a "portion of the housing between the holes" in this embodiment.

Figure 16:
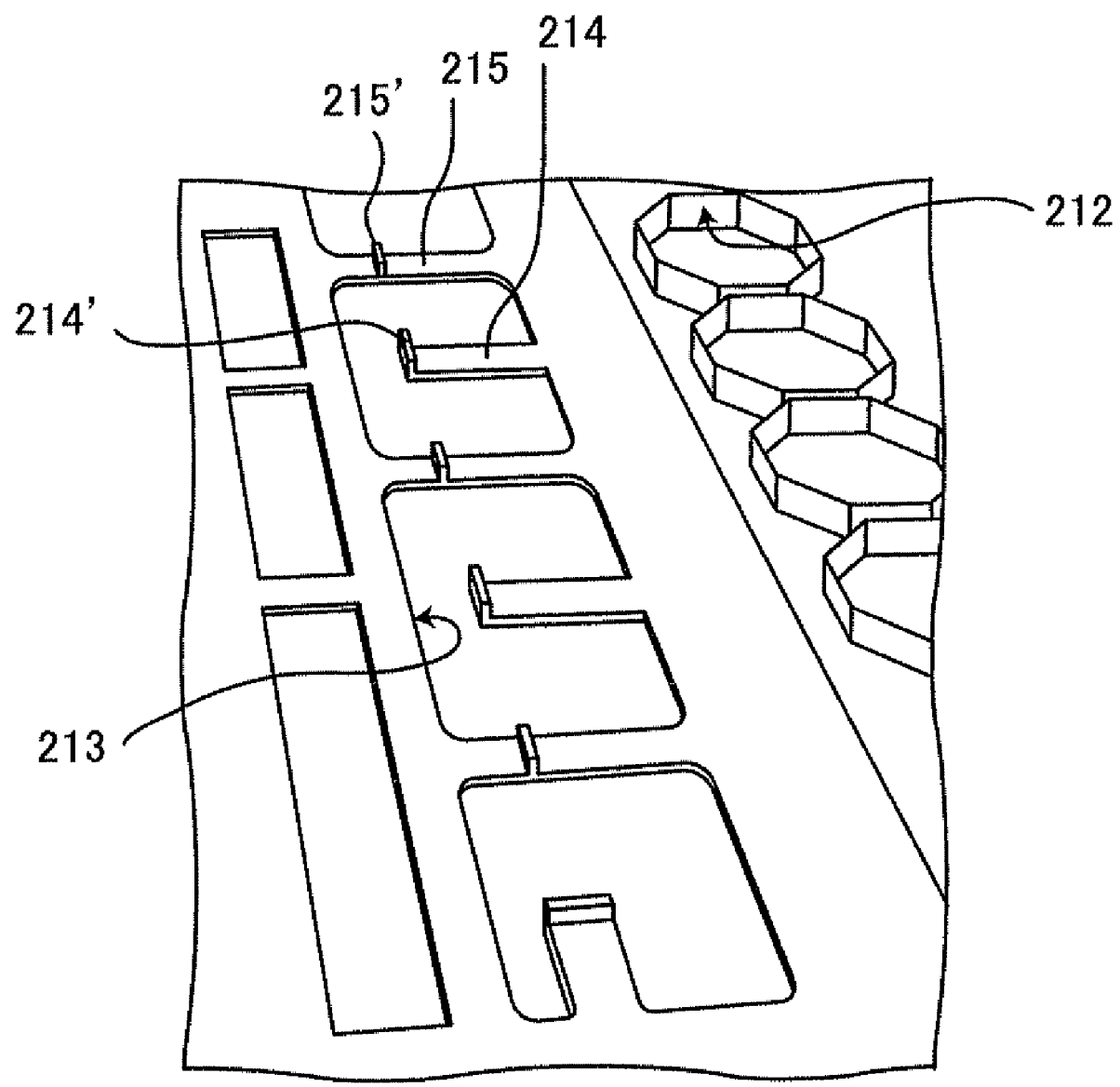
FIG. 16 partly shows a bottom surface of the partition plate on the side positioned to face the battery pack.
Figure 17:
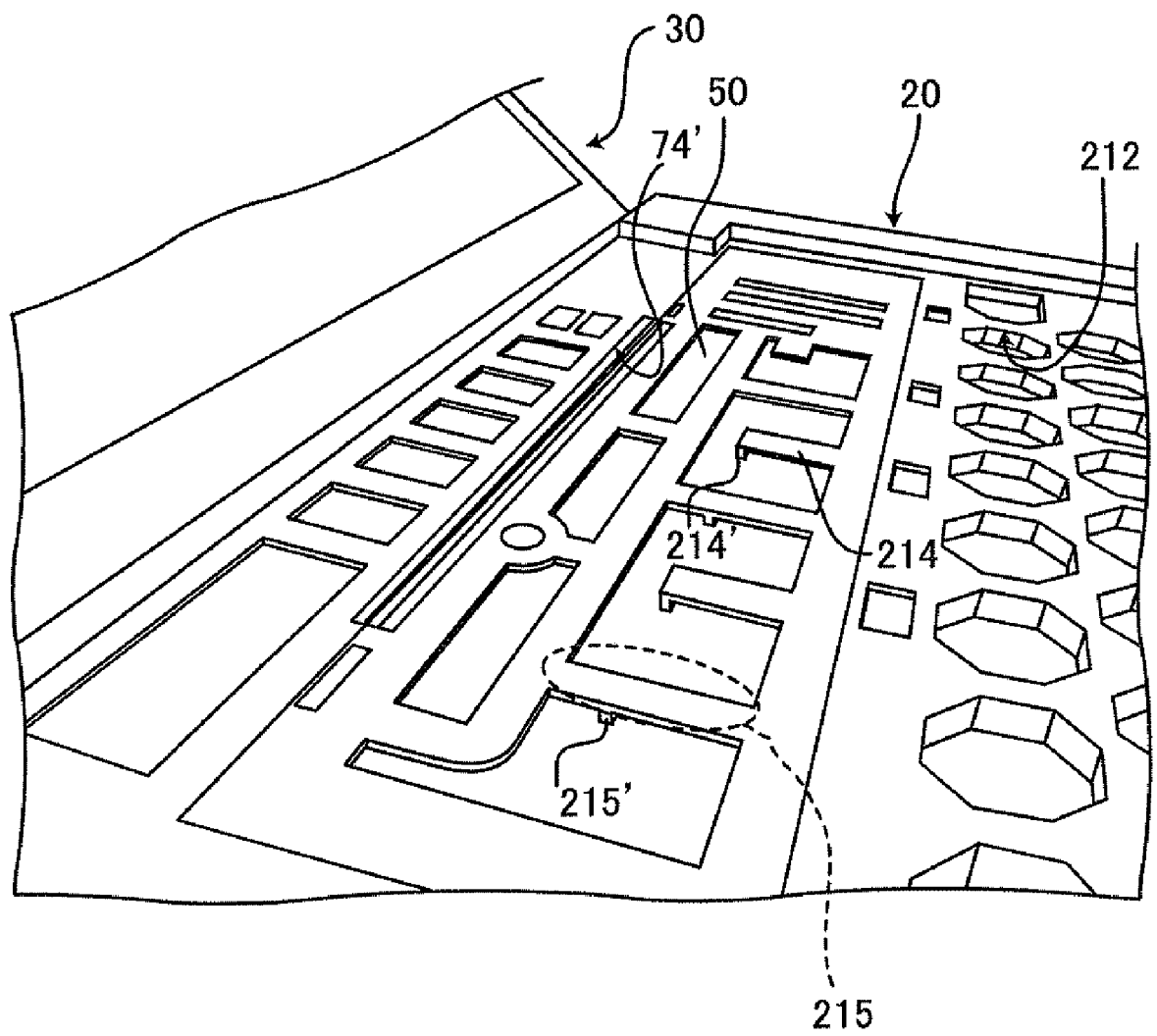
FIG. 17 partly shows an upper surface of the partition plate in the state where the battery pack is loaded.

FIG. 16 partly shows the lower surface of the partition plate 75 on the side positioned to face the battery pack 50. FIG. 17 partly shows the upper surface of the partition plate 75 in the state where the battery pack 50 is loaded.

As shown in FIG. 16, the elastic pieces 214 and the housing portions 215 have respectively projections 214' and 215' projecting toward the battery pack 50. The projections 214' of the elastic pieces 214 are formed to project in larger amounts than the projections 215' of the housing portions 215. The projections 214' of the elastic pieces 214 correspond to one example of a "first projection" in this embodiment. The projections 215' of the housing portions 215' correspond to one example of a "second projection" in this embodiment.

FIG. 17 also shows the structure that the elastic pieces 214 and the housing portions 215 have respectively projections 214' and 215' projecting toward the battery pack 50. The projections 214' and 215' are designed so as to form respective predetermined gaps relative to the battery pack 50 in the state where the battery pack 50 is loaded. More specifically, the projections 214' of the elastic pieces 214 are formed to project in larger amounts than the projections 215' of the housing portions 215. In other words, the gaps formed between the projections 214' of the elastic pieces 214 and the battery pack 50 are designed to be narrower than the gaps formed between the projections 215' of the housing portions 215 and the battery pack 50.

The battery pack 50 has an exterior size differing from the value set in specifications due to variations in manufacturing. When the exterior size of the battery pack 50 is slightly larger than the value set in the specifications due to the variations in manufacturing, only the projections 214' of the elastic pieces 214 contact the battery pack 50 and properly hold the battery pack 50 while absorbing (accommodating) the size error of the battery pack 50.

Thus, since the housing portions 215 do not come into contact with the battery pack 50, damage of the battery pack 50 and a failure of the personal computer 10 which may be otherwise caused due to contact of the battery pack 50 with the housing portions 215 can be prevented. Further, according to this embodiment, the projections 214' of the elastic pieces 214 apply resilient forces on the battery pack 50, to thereby contribute to positively suppressing wobbling of the battery pack 50.

The keyboard 90, shown in FIG. 12, is arranged on the elastic pieces 214 and the housing portions 215. In this embodiment, the size error of the battery pack 50 is absorbed only by the elastic pieces 214 in the state where the housing portions 215 are not in contact with the battery pack 50. As a result, this embodiment can provide a user operating the keyboard 90 mounted on the elastic pieces 214 with a quite normal feeling of key touch. In addition, the keyboard 90 serves to prevent the elastic pieces 214 from being overly bent by pressing.

When the exterior size of the battery pack 50 is even larger than the value set in the design specifications, the battery pack 50 come into contact with both of the elastic pieces 214 and the housing portions 215. The elastic pieces 214 are extended from the partition plate 75 with only one ends thereof connected to the partition plate 75. On the other hand, the housing portions 215 are connected at their opposite ends to the partition plate 75. Accordingly, if the elastic pieces 214 and the housing portions 215 have the same width, resilient forces generated by the elastic pieces 214 are comparatively smaller.

Taking into account such a point, in this embodiment, a width W1 of each elastic piece 214 is set to be larger than a width W2 of each housing portion 215. Therefore, the elastic pieces 214 and the housing portions 215 are evenly deformed so as to generate even resilient forces. As a result, wobbling of the battery pack 50 can be suppressed by the action of even resilient forces. Further, the elastic pieces 214 and the housing portions 215 support the keys 21 from below such that a similar key click feeling can be provided when each of the keys 21 is pressed.

According to this embodiment, as described above, when the error size of the battery pack 50 is relatively small, only the projections 214' of the elastic pieces 214, which are deformed independently of the partition plate 75 (i.e., the housing), contact the battery pack 50 to absorb the size error thereof. Therefore, the user is kept from feeling awkward when operating the keyboard. When the error size of the battery pack 50 is relatively large, both of the projections 214' of the elastic pieces 214 and the projections 215' of the housing portions 215 contact the battery pack 50 such that both the projections exert strong resilient forces upon the battery pack 50 and to absorb the error size thereof.

As shown in FIG. 14 and so on, the partition plate 75 has a plurality of octagonal holes 213 at positions corresponding to the keys 21 of the keyboard 90. The hole 212 corresponds to one example of a "hole formed in the housing" in this embodiment.

Figure 18:
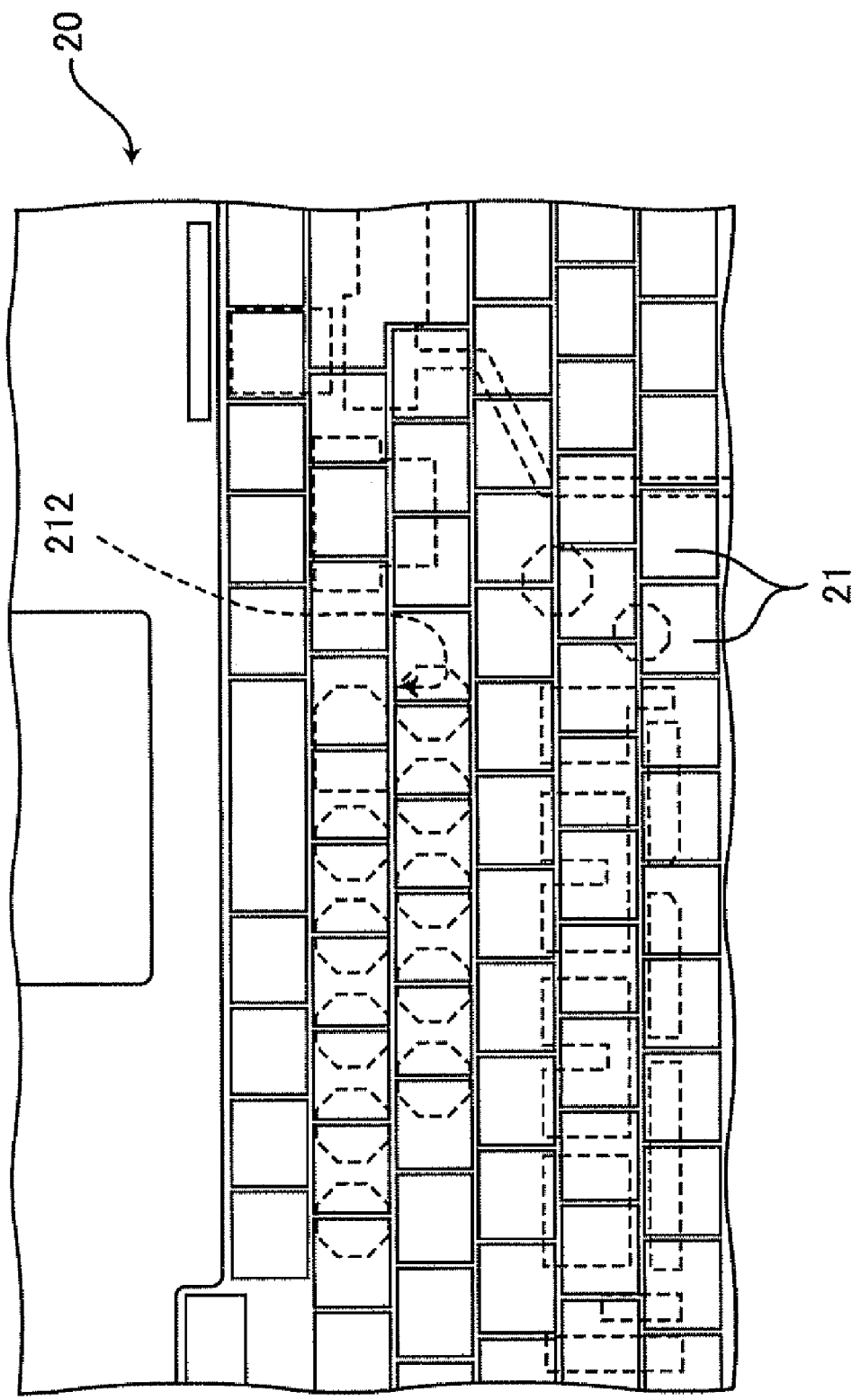
FIG. 18 shows the positional relationship between keys and holes.

FIG. 18 shows the positional relationship between the keys 21 and the holes 212.

As shown in FIG. 18, each of the plurality of keys 21 constituting the keyboard 90 has a rectangular shape. The holes 212 are each arranged such that two upper and lower sides of the octagonal shape are aligned with two upper and lower sides of each of the corresponding adjacent keys 21, and that two right and left sides of each key 21 pass centers of the corresponding adjacent octagonal shapes. In other words, the center of the key 21 is positioned above the housing portion that is present between the adjacent holes 212. As a result, this embodiment can realize a reduction in the weight of the partition plate 75 while maintaining the strength, and can prevent flexing of the keyboard 90 so as to maintain a proper click feeling when the keys 21 are pressed.

Thus, according to this embodiment, the strength required for fixedly holding the keyboard 90 can be maintained and the weight of the personal computer can be reduced.

Further, as shown in FIG. 16, the partition plate 75 comprises a frame which has the same octagonal shape as the hole 212 and which is formed to extend in continuation with the octagonal hole 212 from the lower surface of the partition plate 75 on the side positioned to face the battery pack 50. The octagonal frame contributes to increasing the strength of the housing and providing a higher strength to fixedly hold the keyboard 90.

Various contrivances on the lower surface side of the partition plate 75, shown in FIG. 7, will be described below.

Not only the battery pack 50, but also various electronic components, such as the CPU 101 and the hard disk drive 103, are mounted to the lower surface of the partition plate 75, i.e., on the side opposite to the upper surface thereof on which the keyboard 90 is mounted.

Figure 19:
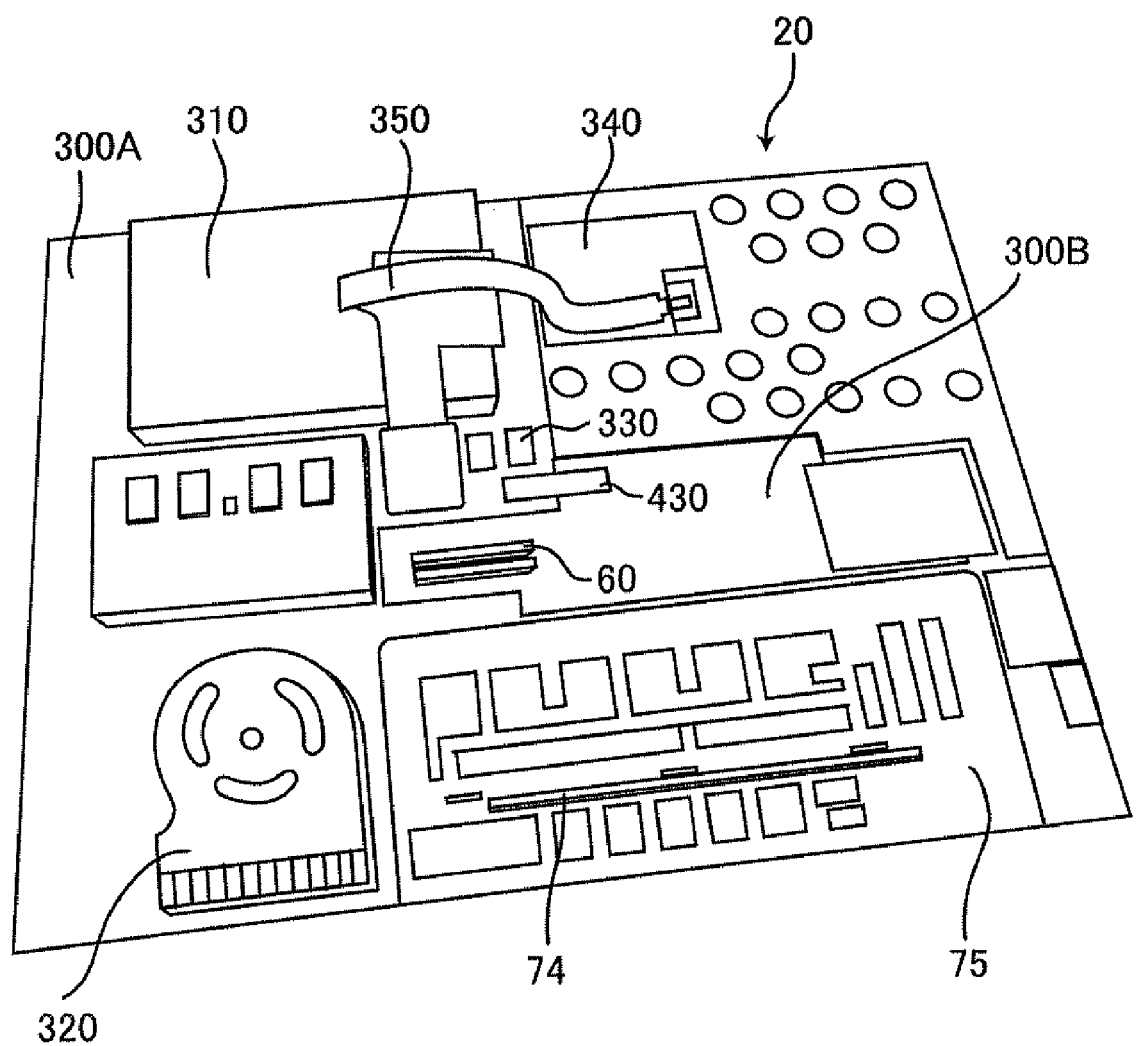
FIG. 19 shows a lower surface of the partition plate.

FIG. 19 shows the lower surface of the partition plate 75.

The lower surface of the partition plate 75 is divided by ribs, for example, into spaces in which individual electronic components are mounted. The electronic components are fixed to the lower surface of the partition plate 75. The electronic components are contained in the housing with the lower case 28B, shown in FIG. 8, fitted in place. An assembly of the partition plate 75 and the upper case 28A corresponds to one example of a "housing frame" in this embodiment. The lower case 28B corresponds to one example of a "housing cover" in this embodiment. A mother board 300A is screwed to the partition plate 75. An auxiliary board 300B is laid over the mother board 300A. A cooling fan 320, a hard disk 310 (constituting the hard disk driver 103 shown in FIG. 6), a control circuit 340, an IC chip 330, etc. are mounted to the mother board 300A. The expansion connector 60, which is also shown in FIG. 5, projects from the auxiliary board 300. Further, the hard disk 310 and the control circuit 340 are interconnected through a flexible printed circuit 350 which is in a folded state. The electronic components on the mother board 300A and the electronic components on the auxiliary board 300B are also interconnected through a flexible printed circuit 430.

Figure 20:
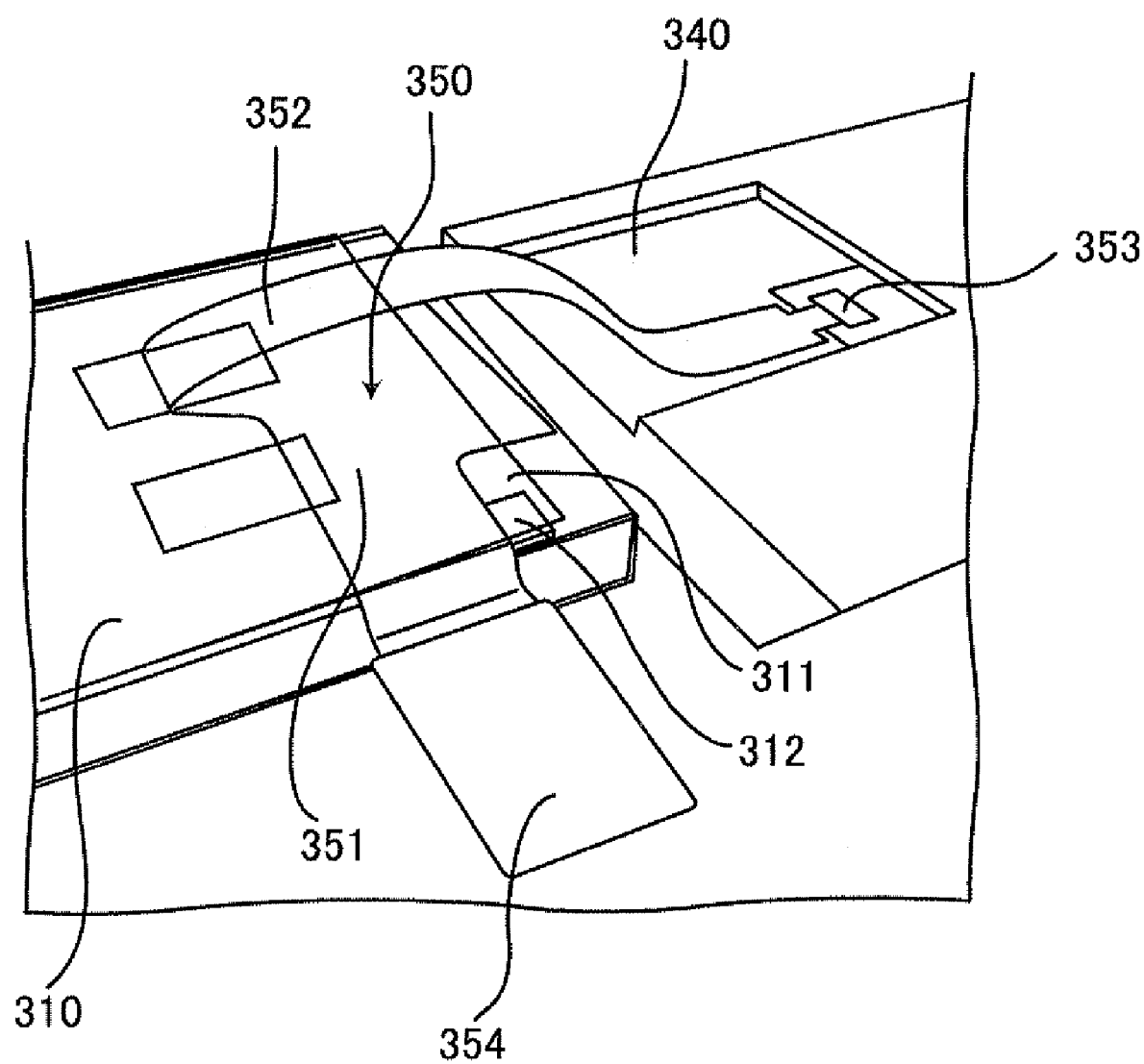
FIG. 20 is an enlarged view of surroundings of a flexible printed circuit.

FIG. 20 is an enlarged view of surroundings of the flexible printed circuit 350.

The flexible printed circuit 350 has a first connector (not shown) which is connected to a connector (not shown) of the hard disk 310. The flexible printed circuit 350 comprises a wide portion 351, an extending portion 352, a second connector 353, and a reinforcing plate 354. The wide portion 351 is bent to extend along the backside of the personal computer 10 with the first connector connected to the hard disk 310. The extending portion 352 is folded from the wide portion 351 toward a connected position of the flexible printed circuit 350 with the hard disk 310 and is extended toward the control circuit 340 in an overlapping relation to the wide portion 351. The second connector 353 is connected to the control circuit 340. The reinforcing plate 354 is extended from the wide portion 351 in a direction crossing the extending portion 352.

The hard disk 310 and the flexible printed circuit 350 are contained in a box-shaped plastic case 311 provided with buffer materials 312. The reinforcing plate 354 is exposed to the outside of the plastic case 311 through respective slits formed at a boundary between an upper surface and a lateral surface of the plastic case 311. The flexible printed circuit 350 is connected to the control circuit 340, etc. The plastic case 311 will be described in detail later The flexible printed circuit 350 corresponds to one example of a "flexible printed circuit" in this embodiment. The reinforcing plate 354 corresponds to one example of a "reinforcing plate" in this embodiment.

Figure 21:
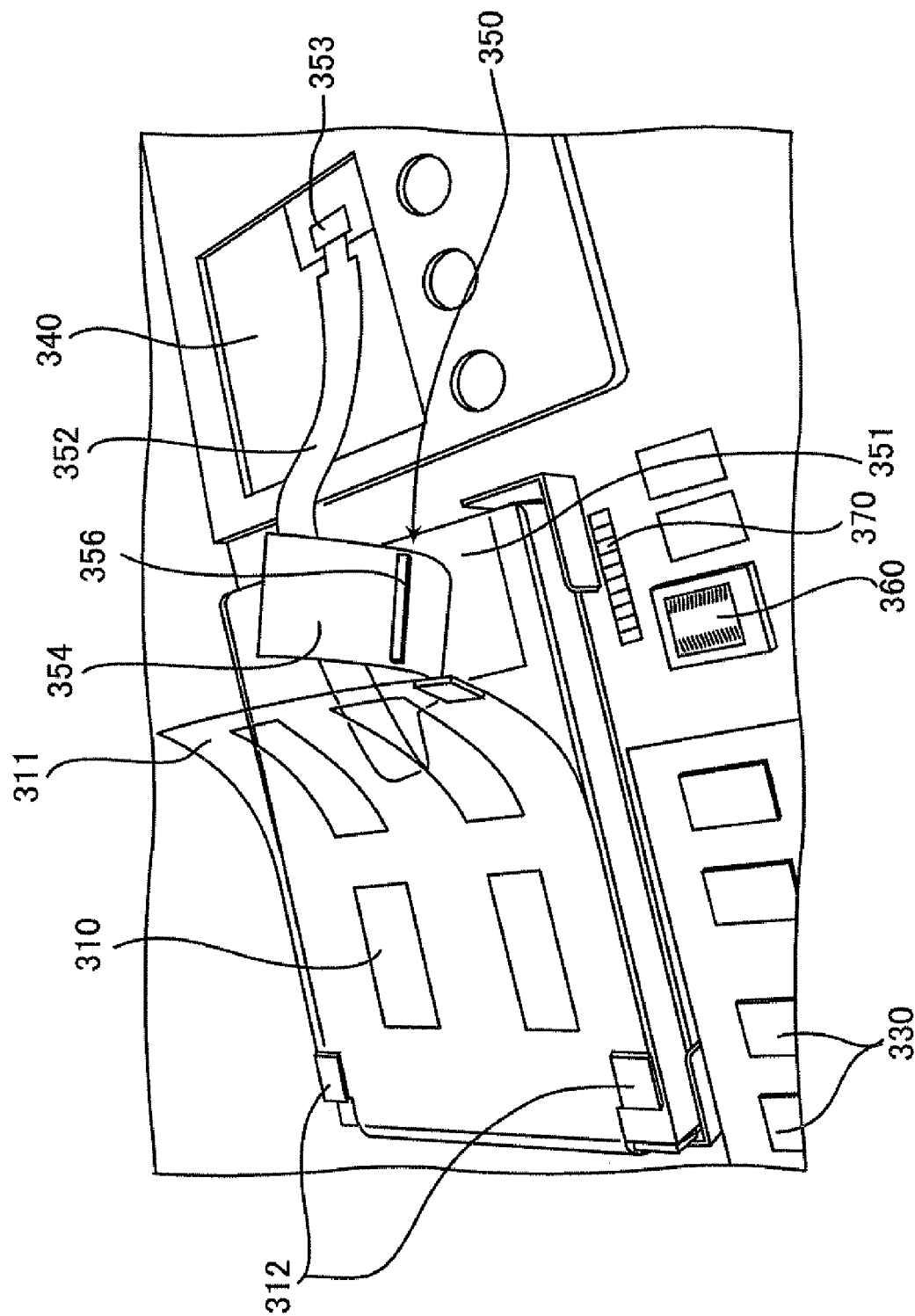
FIG. 21 shows the state where a reinforcing plate of the flexible printed circuit is partly turned up.

FIG. 21 shows the state where the reinforcing plate 354 of the flexible printed circuit 350 is partly turned up.

The mother board 300A comprises, in addition to IC chips 330 mounted to each of personal computers of the same model on the standard basis, an additional IC chip 360 which is selectively added when the security function is added. The reinforcing plate 354 of the flexible printed circuit 350 has a third connector 356 connected to a connector 370 which is mounted to the mother board 300A. The reinforcing plate 354 is extended beyond the position of the third connector 356 so as to cover the additional IC chip 360. Accordingly, the reinforcing plate 354 prevents slipping-off of the additional IC chip 360 with no need of fixing the additional IC chip 360 by screwing or soldering.

The connector 370 mounted to the mother board 300A corresponds to one example of a "first connecting portion" in this embodiment. The third connector 356 of the flexible printed circuit 350 corresponds to one example of a "second connecting portion" in this embodiment. The additional IC chip 360 corresponds to one example of a "component selectively mounted to the circuit board" in this embodiment.

Figure 22:
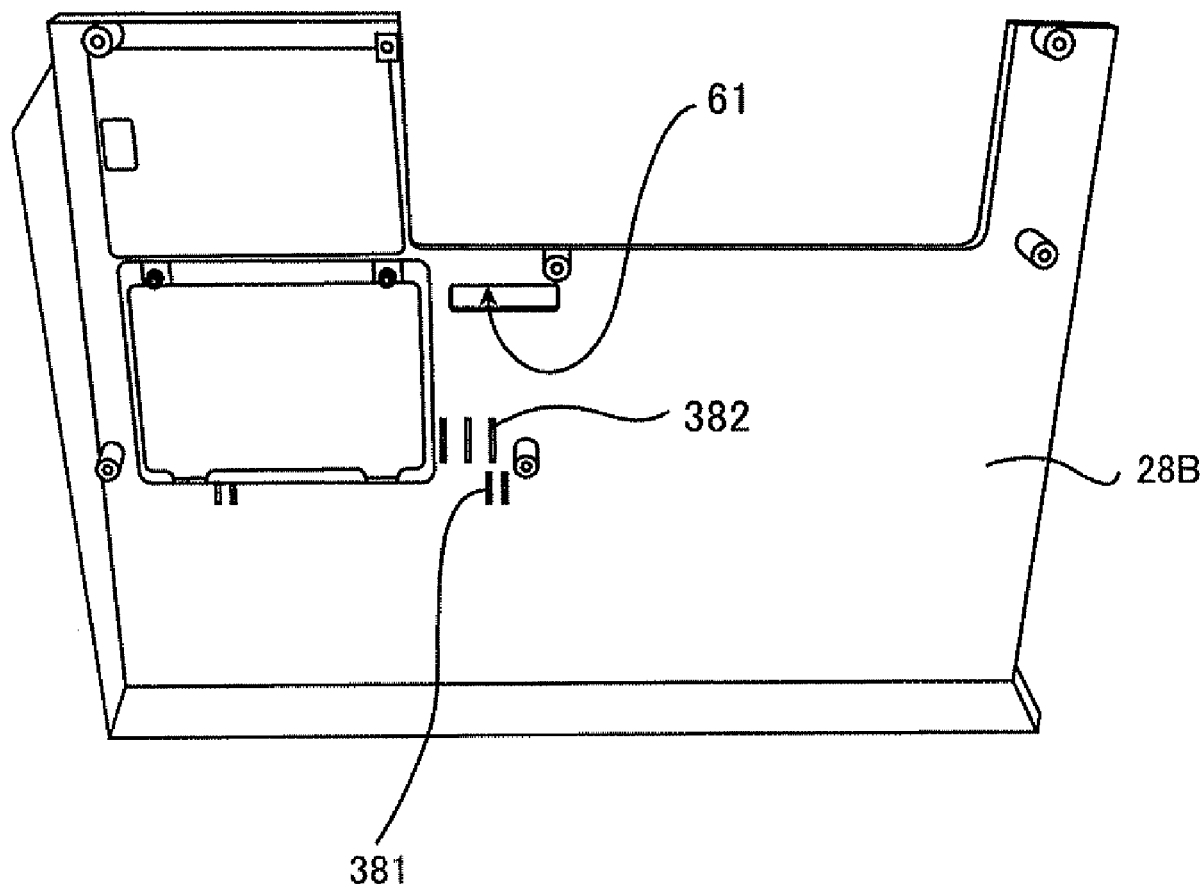
FIG. 22 shows the lower case from the upper surface side.

FIG. 22 shows the lower case 28B, shown in FIG. 8, from the upper surface side.

The lower case 28B has a first projection 381 and a second projection 382 formed on an upper surface thereof. The second projection 382 is provided at a position corresponding to the connector 370 of the mother board 300A when the lower case 28B is fitted to the upper case 28A. The first projection 381 is provided at a position corresponding to the mounted position of the additional IC chip 360 when the lower case 28B is fitted to the upper case 28A. The first projection 381 and the second projection 382 correspond to one example of a "projection abutting against the reinforcing plate" in this embodiment.

The mother board 300A and the auxiliary board 300B, shown in FIG. 19, are pressed by, e.g., screws disposed on an upper surface of the lower case 28B. The various IC chips 330 are soldered to the mother board 300A and the auxiliary board 300B. When an optional function is added, the additional IC chip 360 is connected to the mother board 300A. Further, the lower case 28B is fitted to the upper case 28A in the state where the reinforcing plate 354 of the flexible printed circuit 350 covers the additional IC chip 360.

As a result, the first projection 381 of the lower case 28B presses the connector 370 of the mother board 300A and the third connector 356 of the flexible printed circuit 350 through the reinforcing plate 354. Also, the second projection 382 of the lower case 28B presses the additional IC chip 360 through the reinforcing plate 354. Thus, according to this embodiment, just by fitting the lower case 28B to the upper case 28A, the additional IC chip 360 can be easily and positively prevented from slipping off.

As shown also in FIG. 21, the hard disk 310 is contained in the box-shaped plastic case 311 provided with the buffer materials 312. The plastic case 311 corresponds to one example of a "box-shaped case" in this embodiment.

Figure 23:
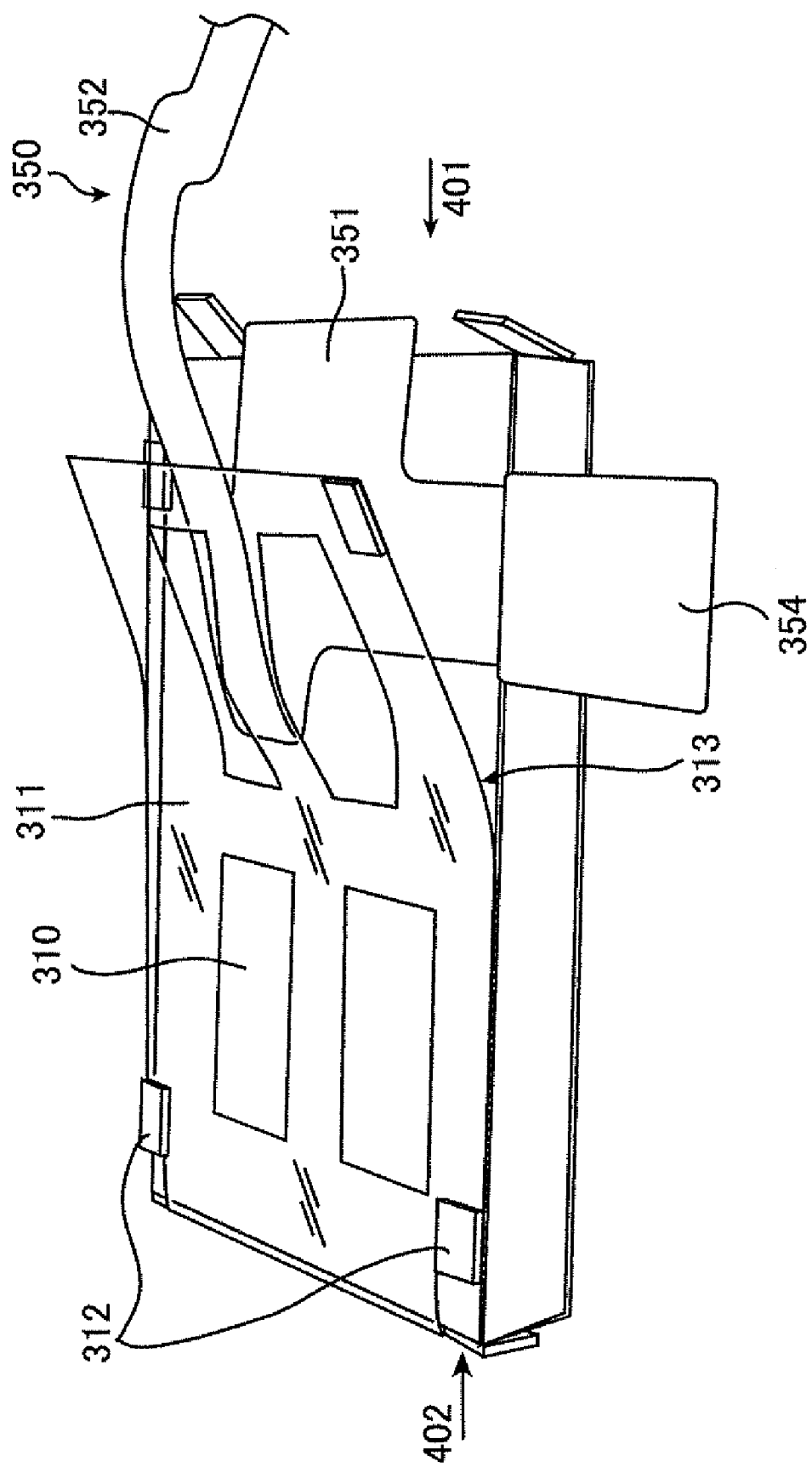
FIG. 23 shows a hard disk, to which the flexible printed circuit is connected, from the lower surface side positioned to face the lower case.
Figure 24:
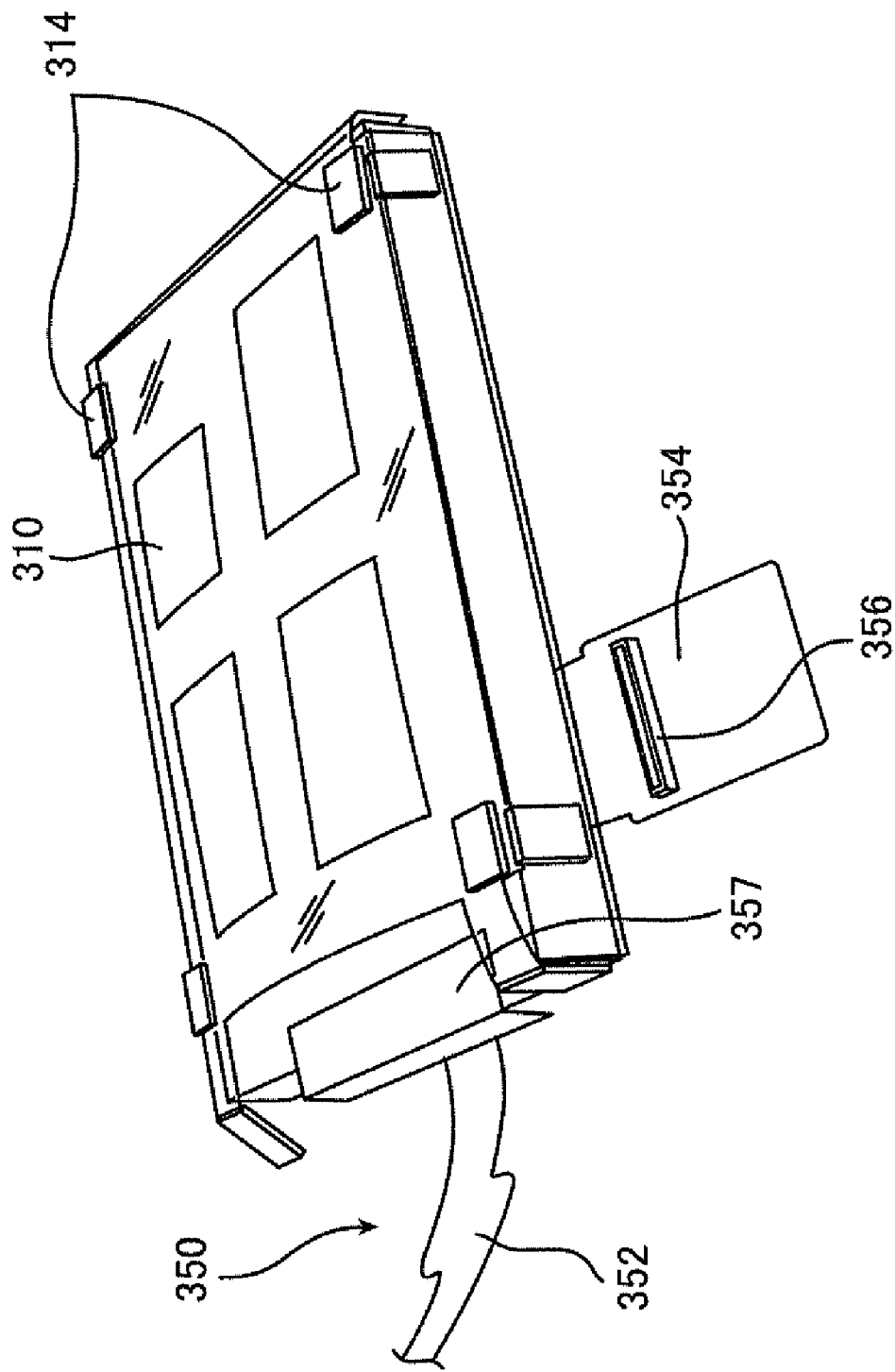
FIG. 24 shows the hard disk from the upper surface side.

FIG. 23 shows the hard disk 310, to which the flexible printed circuit 350 is connected, from the lower surface side positioned to face the lower case 28B. FIG. 24 shows the hard disk 310 from the upper surface side.

As described above, the bent flexible printed circuit 350 is connected to the hard disk 310. The flexible printed circuit 350 comprises the wide portion 351, the extending portion 352, and the reinforcing plate 354. The wide portion 351 provides a main portion of the flexible printed circuit 350, which spreads along the lower surface of the hard disk 310 positioned to face the lower case 28B. The extending portion 352 is folded to extend in an overlapping relation to the wide portion 351. The reinforcing plate 354 is extended in the direction crossing the extending portion 352. The wide portion 351 corresponds to one example of a "first portion" in this embodiment. The extending portion 352 corresponds to one example of a "second portion" in this embodiment. The reinforcing plate 354 corresponds to one example of a "third portion" in this embodiment.

The plastic case 311 is provided with buffer materials 312 and 314 arranged on its surfaces which are positioned to face the lower and upper surfaces of the hard disk 310, respectively. The plastic case 311 has a slit 313 formed on the lower surface side to be used for turning up a part of the plastic case 311 from one lateral surface 401, in which the connector of the hard disk 310 is disposed, toward the other lateral surface 402 located opposite to the one lateral surface 401. The slit 313 allows the flexible printed circuit 350 to be easily fitted into the plastic case 311. The buffer material 312 contacting with the lower cover 32B corresponds to one example of a "second buffer material" in this embodiment. The buffer material 314 positioned to face the partition plate 75 corresponds to one example of a "first buffer material" in this embodiment.

In this embodiment, the flexible printed circuit 350 connected to the hard disk 310 is interposed in the folded state between the hard disk 310 and the lower cover 32B. In case of the personal computer 10 being dropped, therefore, the flexible printed circuit 350 serves as a cushion to absorb impacts. As a result, according to this embodiment, impacts exerted on the hard disk 310 can be reduced and accidents, such as a failure and/or damage of the hard disk 310, can be prevented without using a large amount of additional buffer materials or the like.

The expansion connector 60, shown in FIG. 19, will be described in detail below.

As shown in FIG. 19, the auxiliary board 300B is laid over the mother board 300A. In such a state, the expansion connector 60 projects from the auxiliary board 300B and is exposed, as shown in FIG. 5, via the through-hole 61 of the main unit housing 28.

Figure 25:
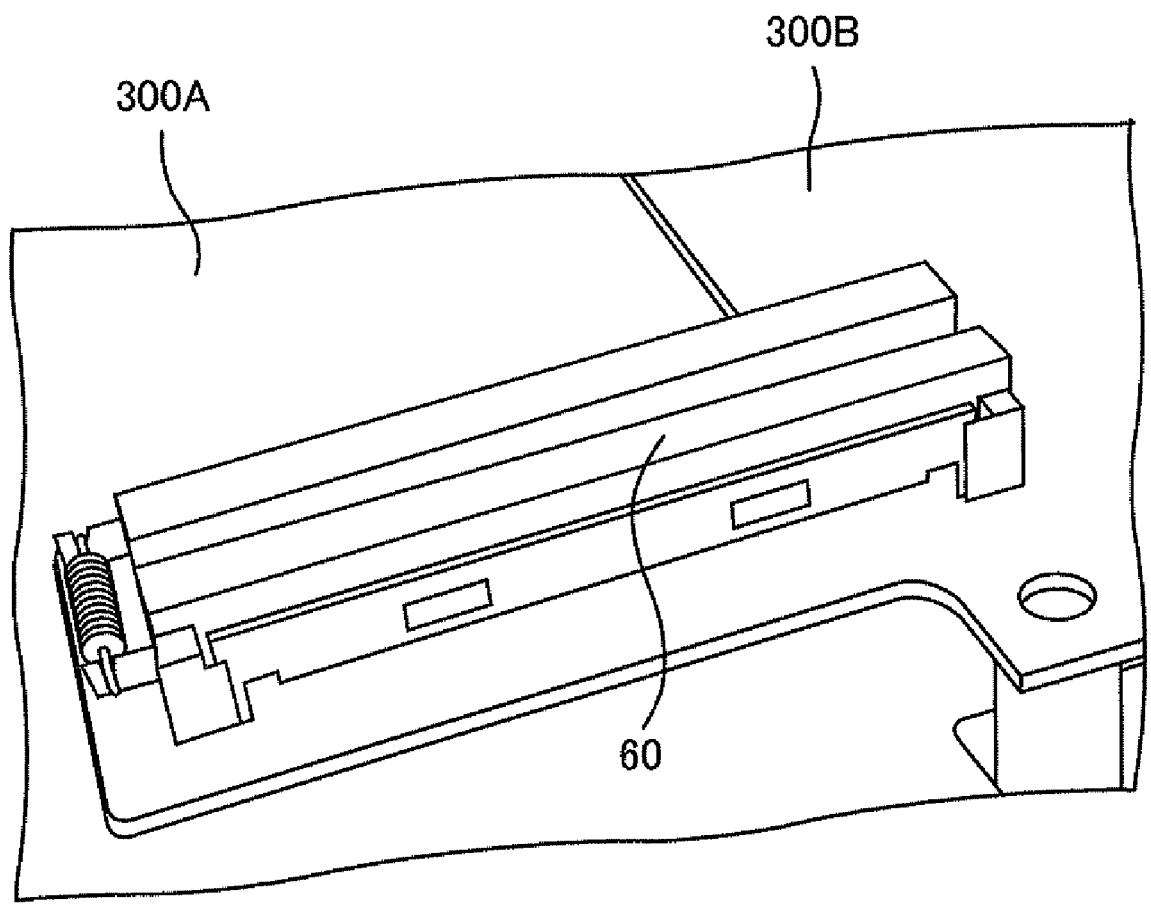
FIG. 25 is an enlarged view of surroundings of an expansion connector.

FIG. 25 is an enlarged view of surroundings of the expansion connector 60.

As shown in FIG. 25, there is a level difference between the mother board 300A and the auxiliary board 300B. The auxiliary board 300B is protruded toward the side nearer to the lower case 28B than the mother board 300A.

Figure 26:
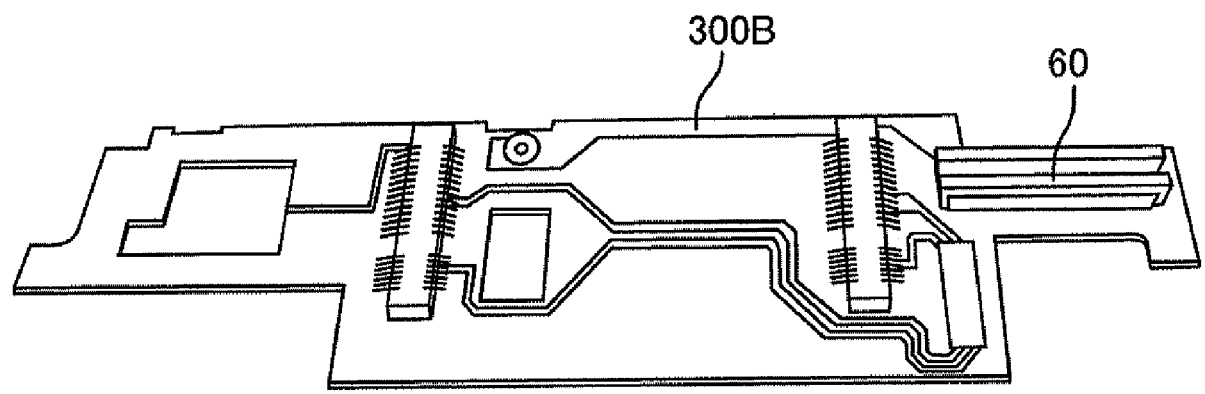
FIG. 26 shows a lower surface of an auxiliary board on the side positioned to face the lower cover.
Figure 27:
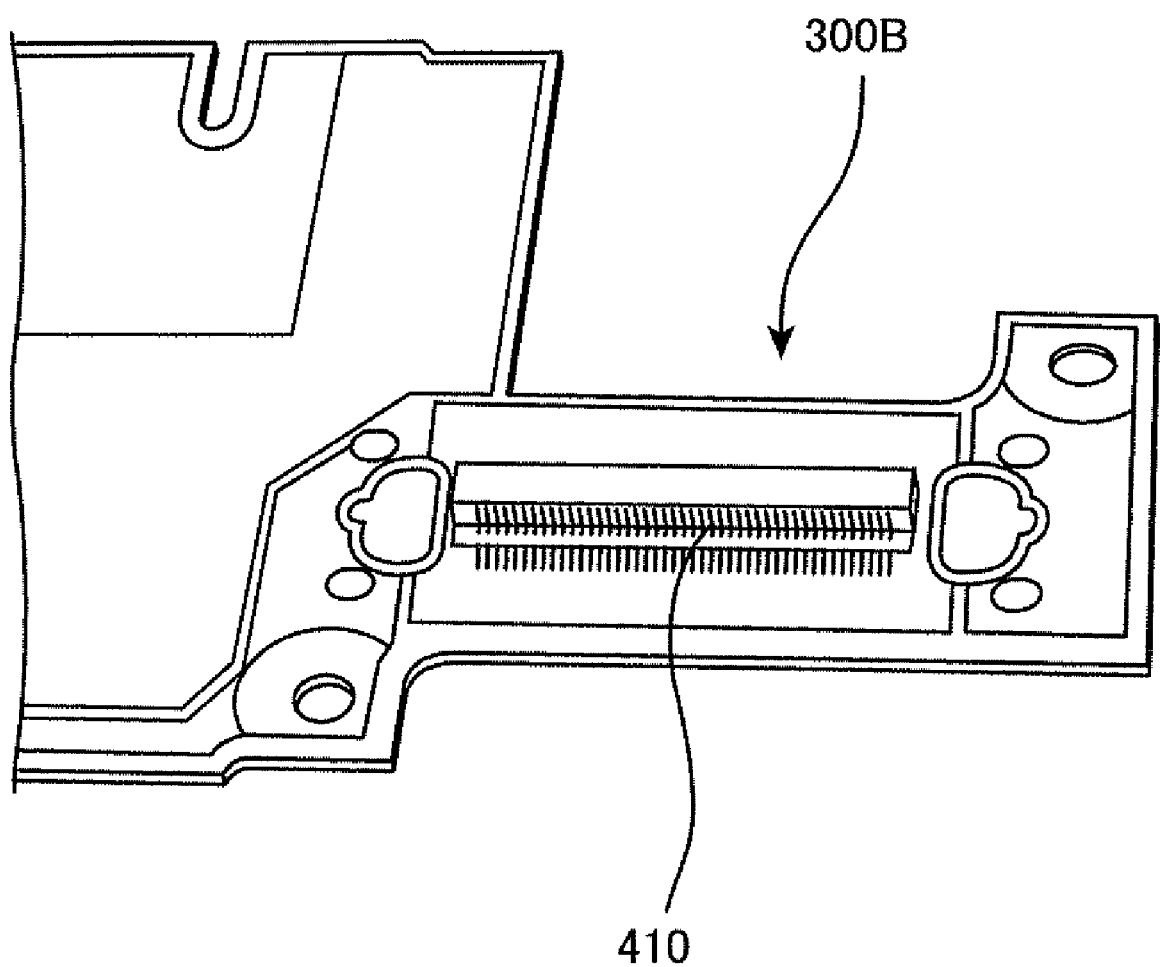
FIG. 27 partly shows an upper surface of the auxiliary board.

FIG. 26 shows a lower surface of the auxiliary board 300B on the side positioned to face the lower case 28B. FIG. 27 partly shows an upper surface of the auxiliary board 300B.

The expansion connector 60 is mounted to the lower surface of the auxiliary board 300B. A coupling connector 410 is mounted, in an opposed relation to the expansion connector 60, to the auxiliary board 300B in the state where the auxiliary board 300B is interposed between the coupling connector 410 and the expansion connector 60. The expansion connector 60 corresponds to one example of a "third connector" in this embodiment. The coupling connector 410 corresponds to one example of a "second connector" in this embodiment. The auxiliary board 300B corresponds to one example of a "second circuit board" in this embodiment.

Figure 28:
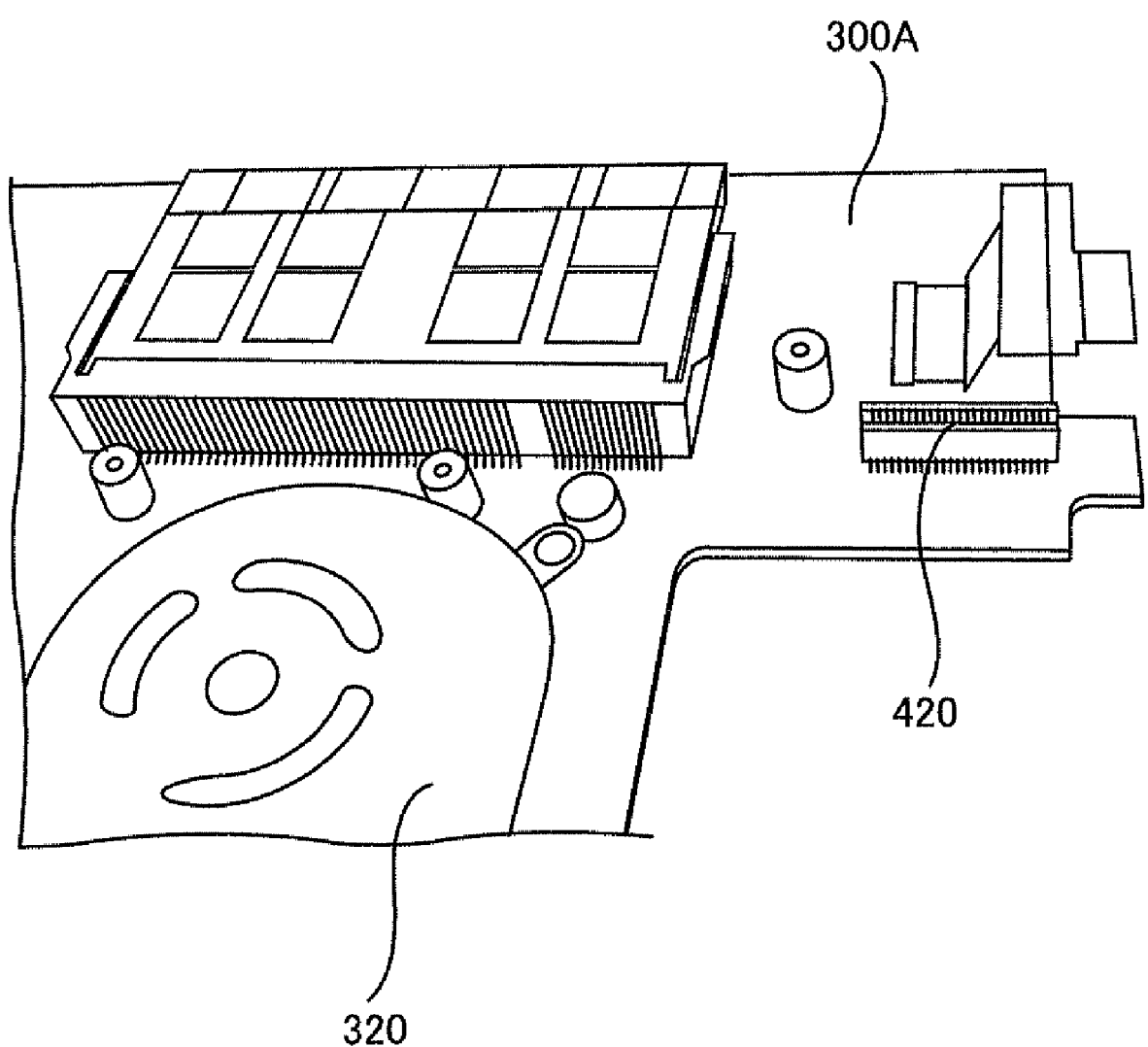
FIG. 28 partly shows a mother board in the state where the auxiliary board is removed.

FIG. 28 partly shows the mother board 300A in the state where the auxiliary board 300B is removed.

A main-unit-side connector 420 to which the coupling connector 410, shown in FIG. 27, of the auxiliary board 300B is connected is mounted to a lower surface of the mother board 300A on the side positioned to face the lower case 28B. The main-unit-side connector 420 corresponds to one example of a "first connector" in this embodiment. The mother board 300A corresponds to one example of a "first circuit board" in this embodiment.

When the auxiliary board 300B is connected to the mother board 300A, the coupling connector 410 of the auxiliary board 300B is fitted to the main-unit-side connector 420 of the mother board 300A. This means that the main-unit-side connector 420, the coupling connector 410 of the auxiliary board 300B, and the expansion connector 60 are joined together in an overlapped relation. With such an arrangement, this embodiment can eliminate the need of specially manufacturing a long connector capable of directly interconnecting the mother board 300A and the port replicator. According to this embodiment, therefore, the port replicator can be positively connected to the personal computer while the cost is reduced.

Figure 29:
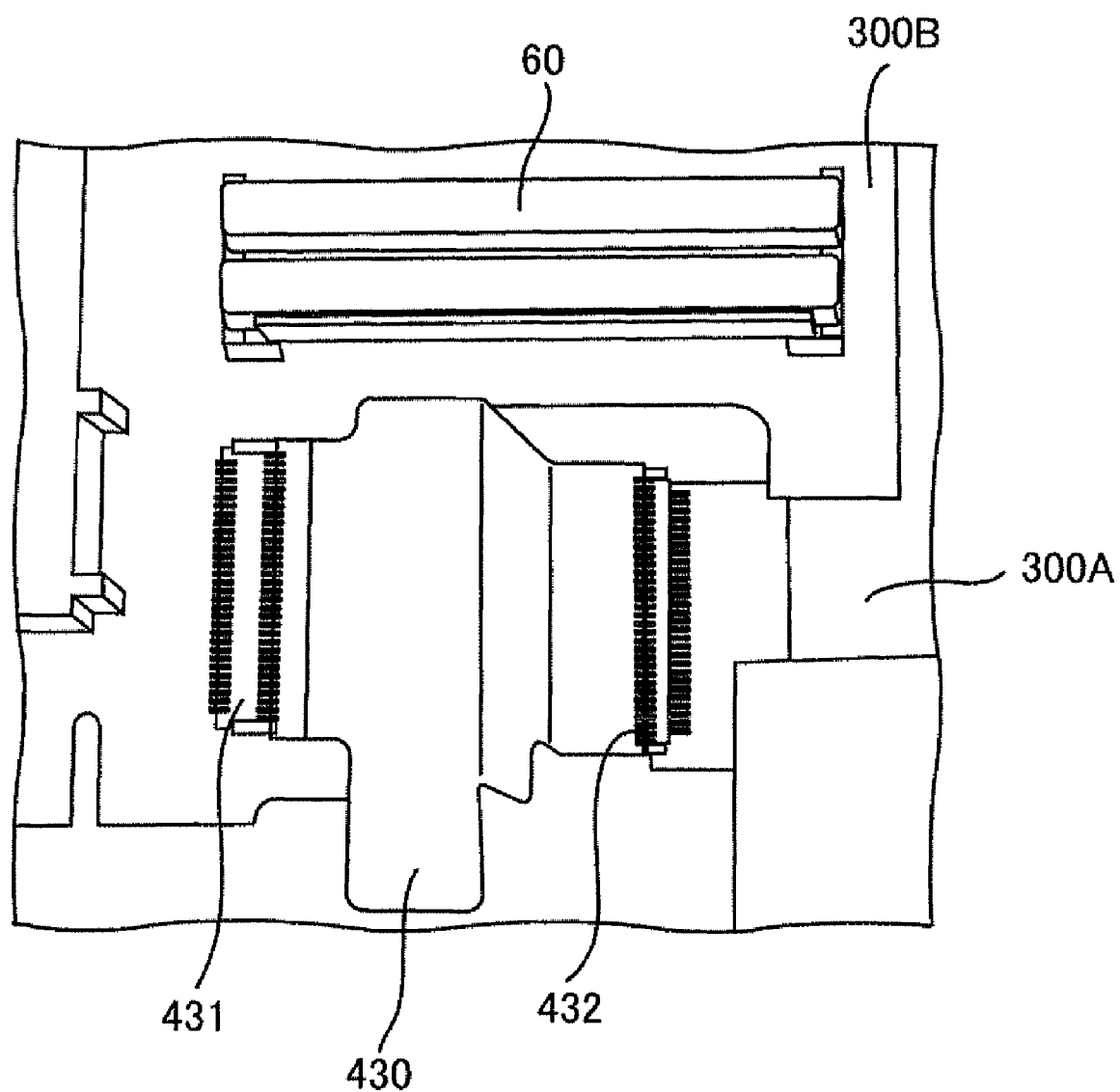
FIG. 29 is an enlarged view of surroundings of the expansion connector.

FIG. 29 is an enlarged view of surroundings of the expansion connector 60.

As shown in FIG. 29, the mother board 300A and the auxiliary board 300B comprise connectors 431 and 432, respectively, in addition to the main-unit-side connector 420, the coupling connector 410 of the auxiliary board 300B, and the expansion connector 60. The connectors 431 and 432 interconnect the electronic components mounted to the mother board 300A and the auxiliary board 300B by using a flexible printed circuit 430. The flexible printed circuit 430 corresponds to one example of a "signal line" in this embodiment.

A space formed due to the level difference between the mother board 300A and the auxiliary board 300B can be effectively utilized by interconnecting the electronic components mounted to the mother board 300A and the auxiliary board 300B through the flexible printed circuit 430. As a result, this embodiment further contributes to reducing the size of the personal computer.

Figure 30:
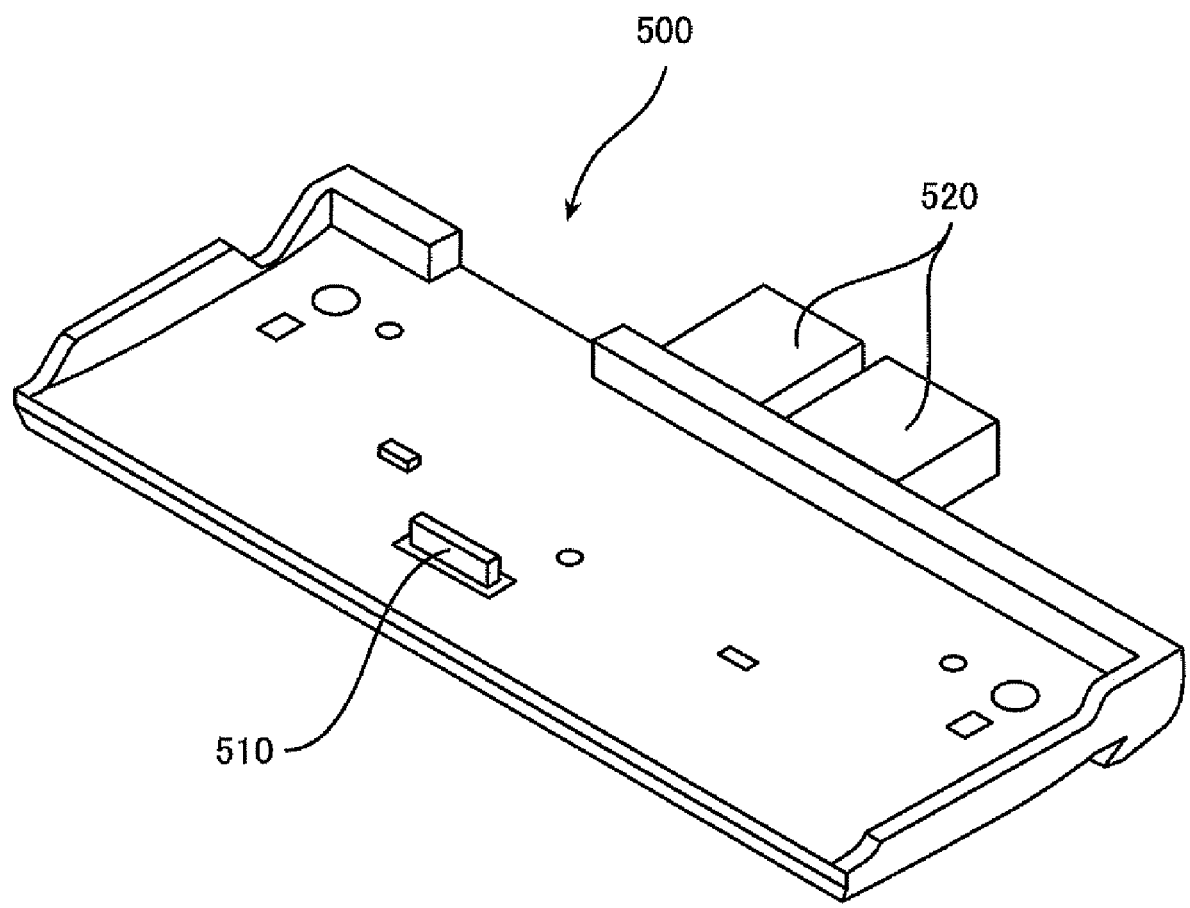
FIG. 30 is an external appearance view of a port replicator.
Figure 31:
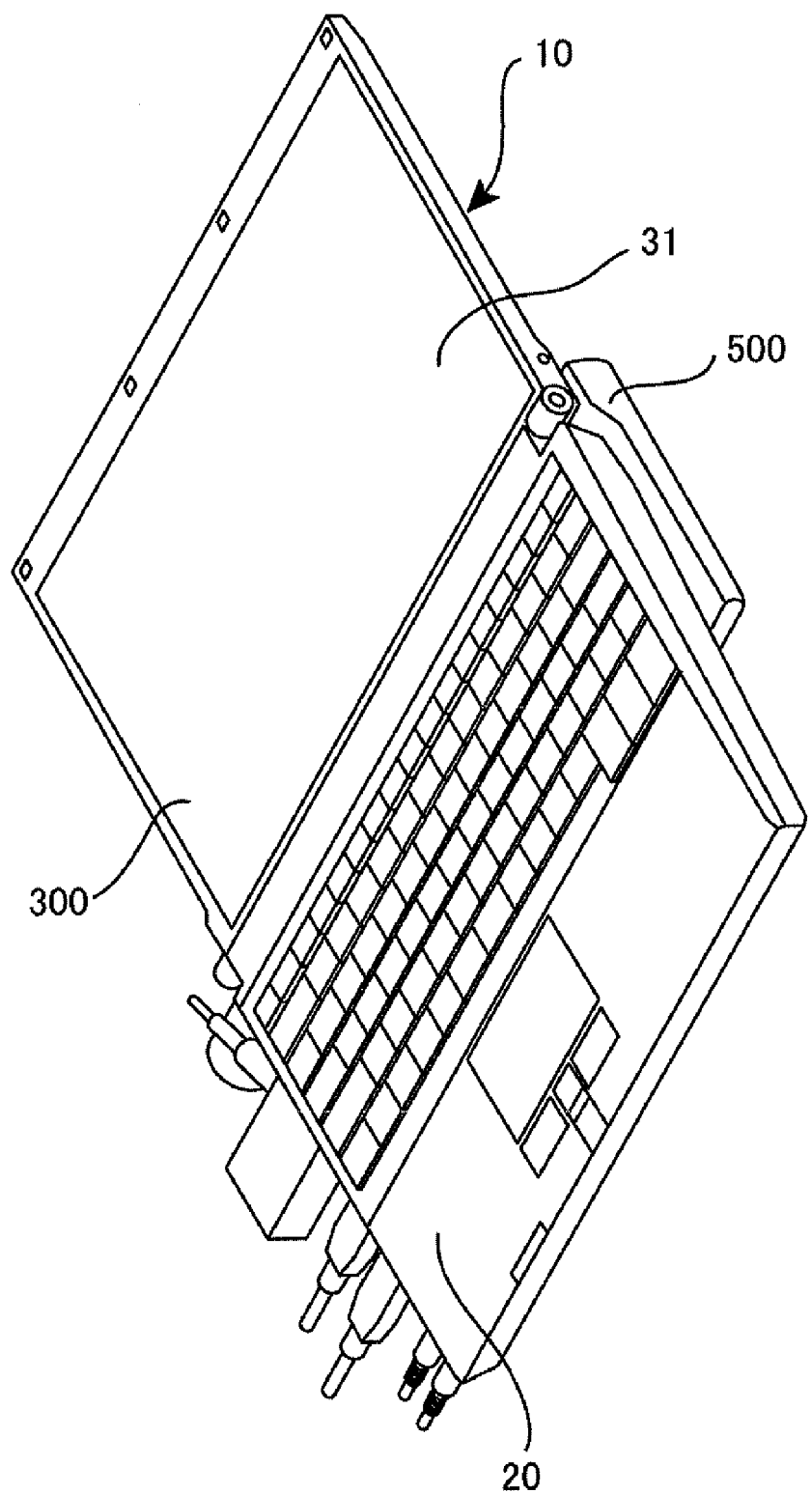
FIG. 31 shows the state where the personal computer is mounted to the port replicator.

FIG. 30 is an external appearance view of a port replicator 500. FIG. 31 shows the state where the personal computer 10 is mounted to the port replicator 500.

As shown in FIG. 30, the port replicator 500 comprises, on its upper surface, a connector 510 which is connected to the expansion connector 60 of the personal computer 10 when the personal computer 10 is mounted to the port replicator 500. The connector 510 corresponds to one example of a "connector of an external device" in this embodiment. When the personal computer 10 is attached to and detached from the port replicator 500, the expansion connector 60 is pushed and pulled by strong forces. In this embodiment, however, the main-unit-side connector 420, the coupling connector 410 of the auxiliary board 300B, and the expansion connector 60 are joined together in an overlapped relation such that they are fixedly held with a higher strength. As a result, this embodiment can prevent the expansion connector 60 from wobbling or being damaged even when the personal computer 10 is repeatedly attached and detached.

Contrivances for reducing the size and the weight of the display unit 30 will be described below.

Figure 32:
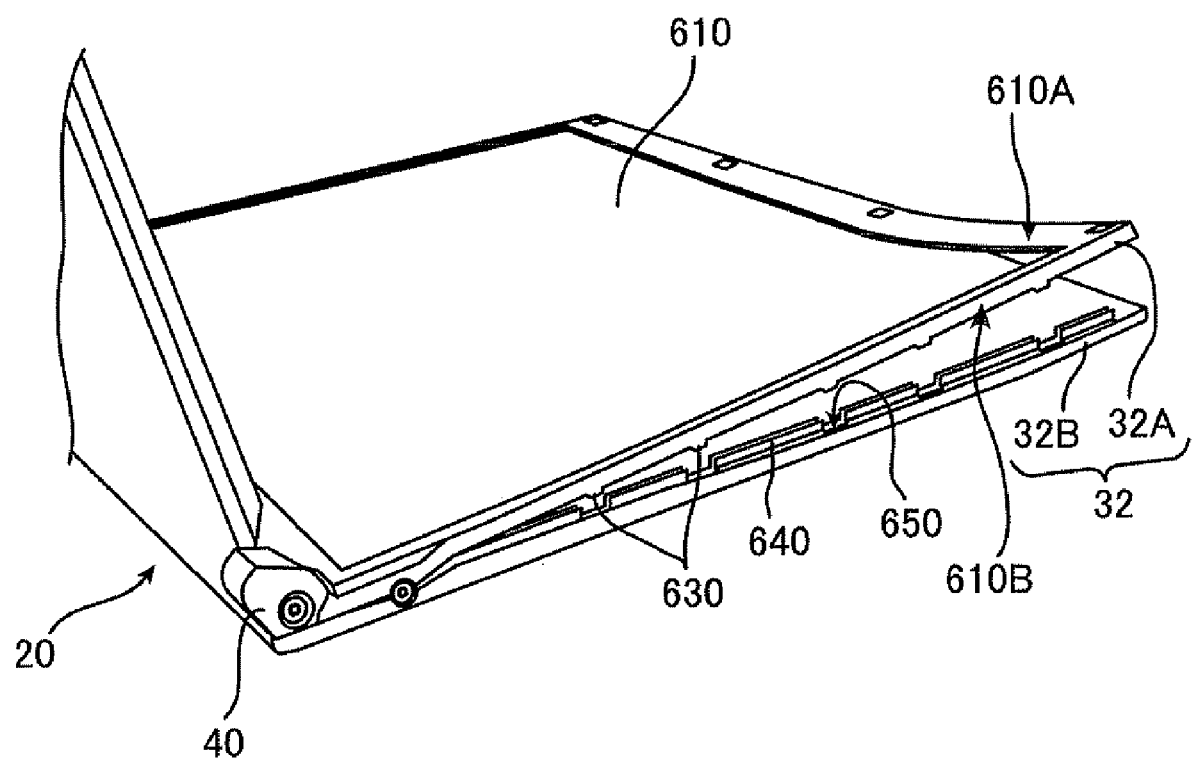
FIG. 32 shows a display unit from a side.

FIG. 32 shows the display unit 30 from a side.

The display unit 30 comprises a liquid crystal panel 610 held between the front cover 32A and the rear cover 32B. The front cover 32A corresponds to one example of a "front cover" in this embodiment. The rear cover 32B corresponds to one example of a "rear cover" in this embodiment. The liquid crystal panel 610 corresponds to one example of a "display panel" in this embodiment.

The front cover 32A has a front frame 610A and a front rib 610B. The front frame 610A covers a peripheral edge of the liquid crystal panel 610 on the front surface side thereof. The front rib 610B is formed to extend over lateral surfaces of the liquid crystal panel 610. Further, the front cover 32A has a plurality of projections 630 projecting at intervals from a rear end surface of the front rib 610B, which is positioned to face the rear cover 32B. The front frame 610A corresponds to one example of a "front frame" in this embodiment. The front rib 610B corresponds to one example of a "front rib" in this embodiment. The projection 630 corresponds to one example of a "projection coming into a dent" in this embodiment. Further, the front rib 610B corresponds to one example of a "second rib" in this embodiment. The rear end surface of the front cover 32A corresponds to one example of a "second end surface" in this embodiment.

The rear cover 32B covers the lateral surfaces and a rear surface of the liquid crystal panel 610 in the state where the rear cover 32B is fitted to the front rib 610B. A front end surface of the rear cover 32B positioned to face the front rib 610B has a stepped portion with a large level difference in its inner area closer to the liquid crystal panel 610. An upper step portion 640 defining the stepped portion has a plurality of dents 650 which are more deeply recessed than a lower step portion defining the stepped portion and into which the projections 630 of the front rib 610B are inserted. The dent 650 corresponds to one example of a "dent" in this embodiment. Further, the portion of the rear cover 32B, which covers the lateral surfaces of the liquid crystal panel 610, corresponds to one example of a "first rib" in this embodiment. The front end surface of the rear cover 32B corresponds to one example of a "first end surface" in this embodiment.

Figure 33:
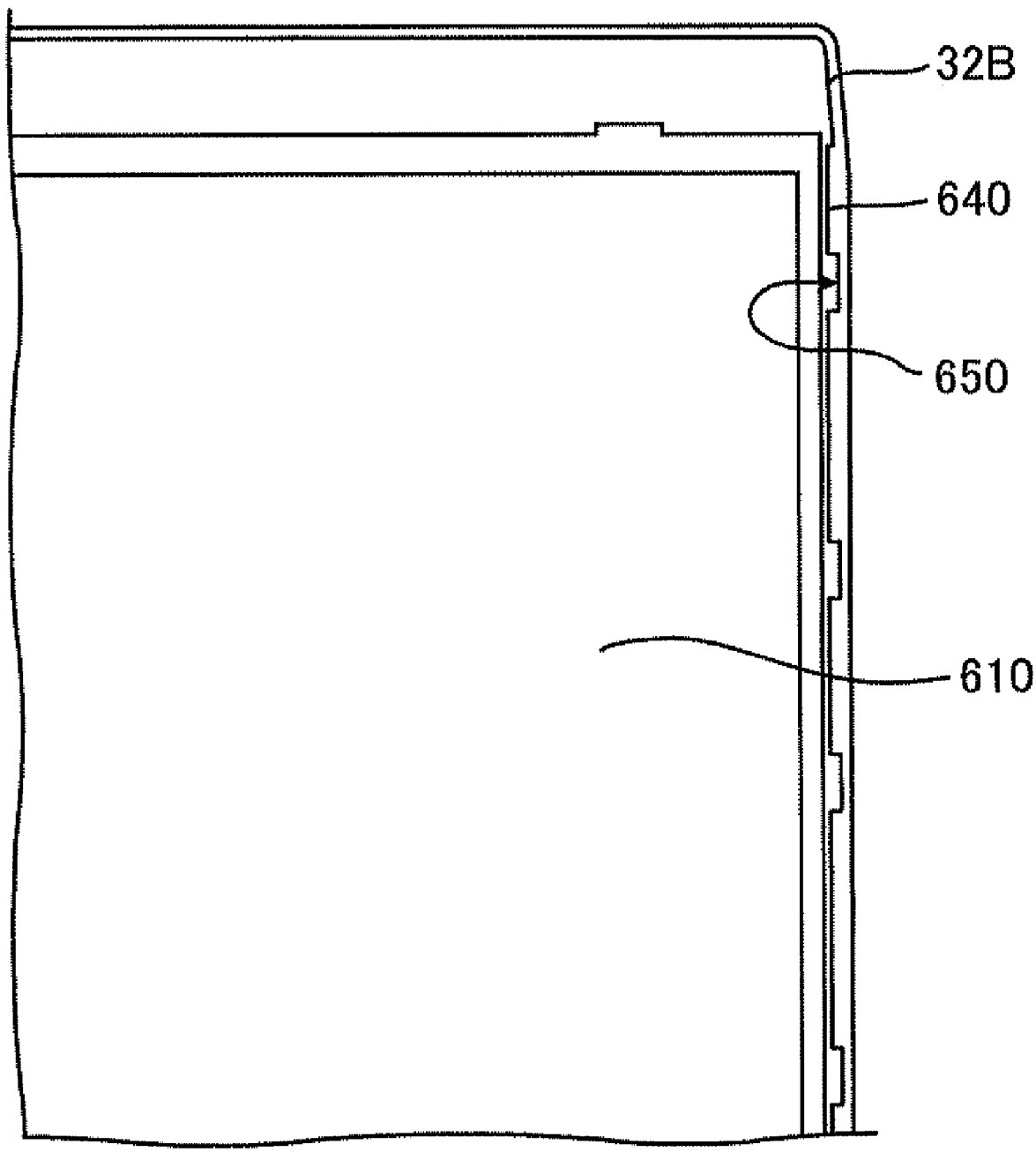
FIG. 33 shows a display panel (liquid crystal panel) attached to a rear cover.

FIG. 33 shows the liquid crystal panel 610 attached to the rear cover 32B.

As shown in FIG. 33, the plurality of dents 650 of the rear cover 32B are provided at intervals along the lateral sides of the rear cover 32B and are opened to the front end surface and the inner surface of the rear cover 32B.

Figure 34:
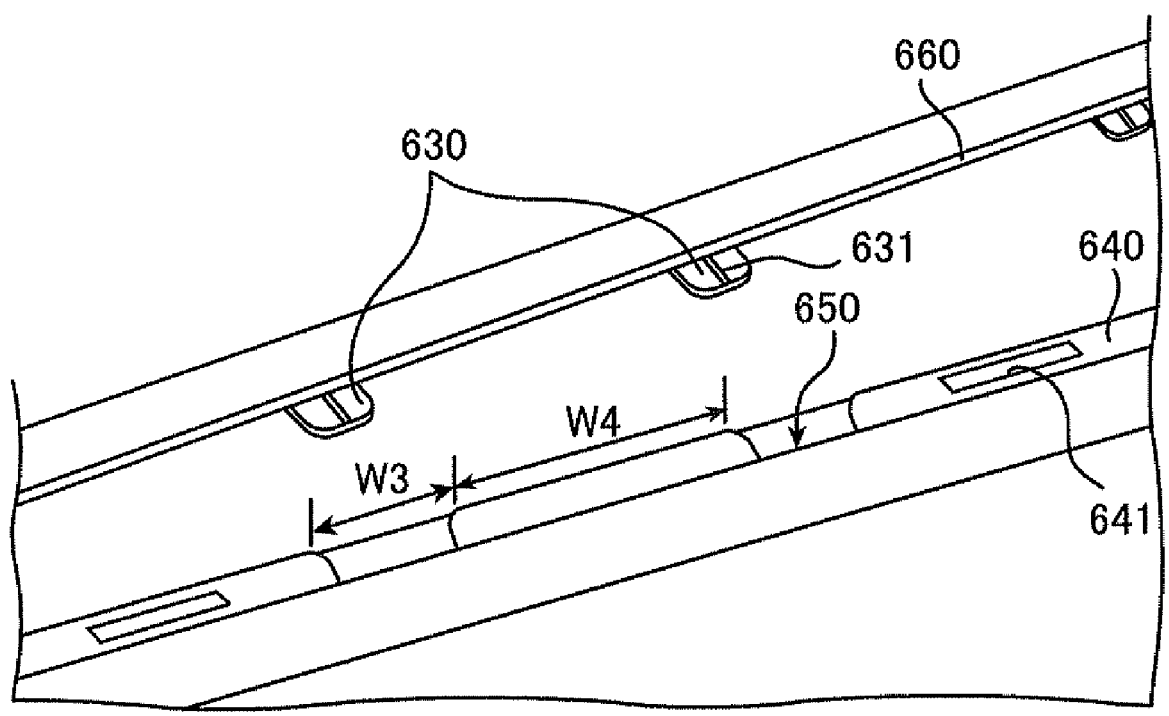
FIG. 34 is an enlarged view of a portion where a front cover and the rear cover are fitted to each other.

FIG. 34 is an enlarged view of a portion where the front cover 32A and the rear cover 32B are fitted to each other.

Each of the projections 630 of the front cover 32A, shown also in FIG. 32, has a linear projection 631 formed in its central portion to absorb the dimensional error of the dent 650. A frame portion 660 of the front cover 32A abuts against the lower step portion which is formed in the front end surface of the rear cover 32B and which defines the above-mentioned stepped portion. The upper step portion 640 of the rear cover 32B comes into the inner side of the frame portion 660 of the front cover 32A. The upper step portion 640 has a salient part 641 projecting outwards. The salient part 641 engages with a salient part 661 (see FIG. 37) provided on the frame portion 660. Further, the projections 630 of the front cover 32A are inserted into the dents 650 of the rear cover 32B, respectively. As shown in FIG. 34, each dent 650 has a width W3 narrower than a width W4 of the upper step portion 640. Therefore, the display housing 32 can maintain a sufficient strength.

Figure 35:
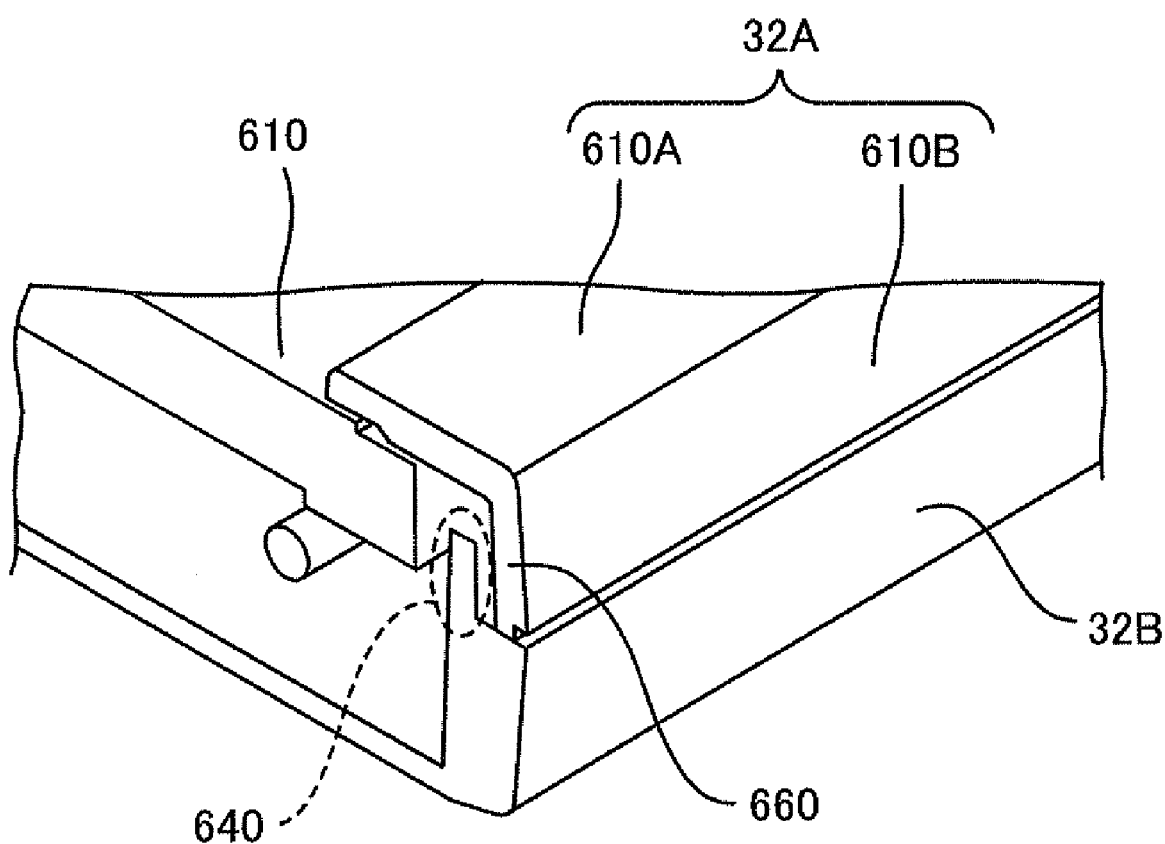
FIG. 35 shows a cross-section of a display unit in a first region where a salient part is not provided in an upper step portion of the rear cover.

FIG. 35 shows a cross-section of the display unit 30 in a first region where the salient part 641 is not provided in the upper step portion 640 of the rear cover 32B.

In the first region of the display unit 30 shown in FIG. 35, the frame portion 660 of the front cover 32A abuts against the lower step portion of the rear cover 32B, which defines the above-mentioned stepped portion. Further, the upper step portion 640 of the rear cover 32B comes into the inner side of the frame portion 660 of the front cover 32A to be overlapped with the frame portion 660.

Figure 36:
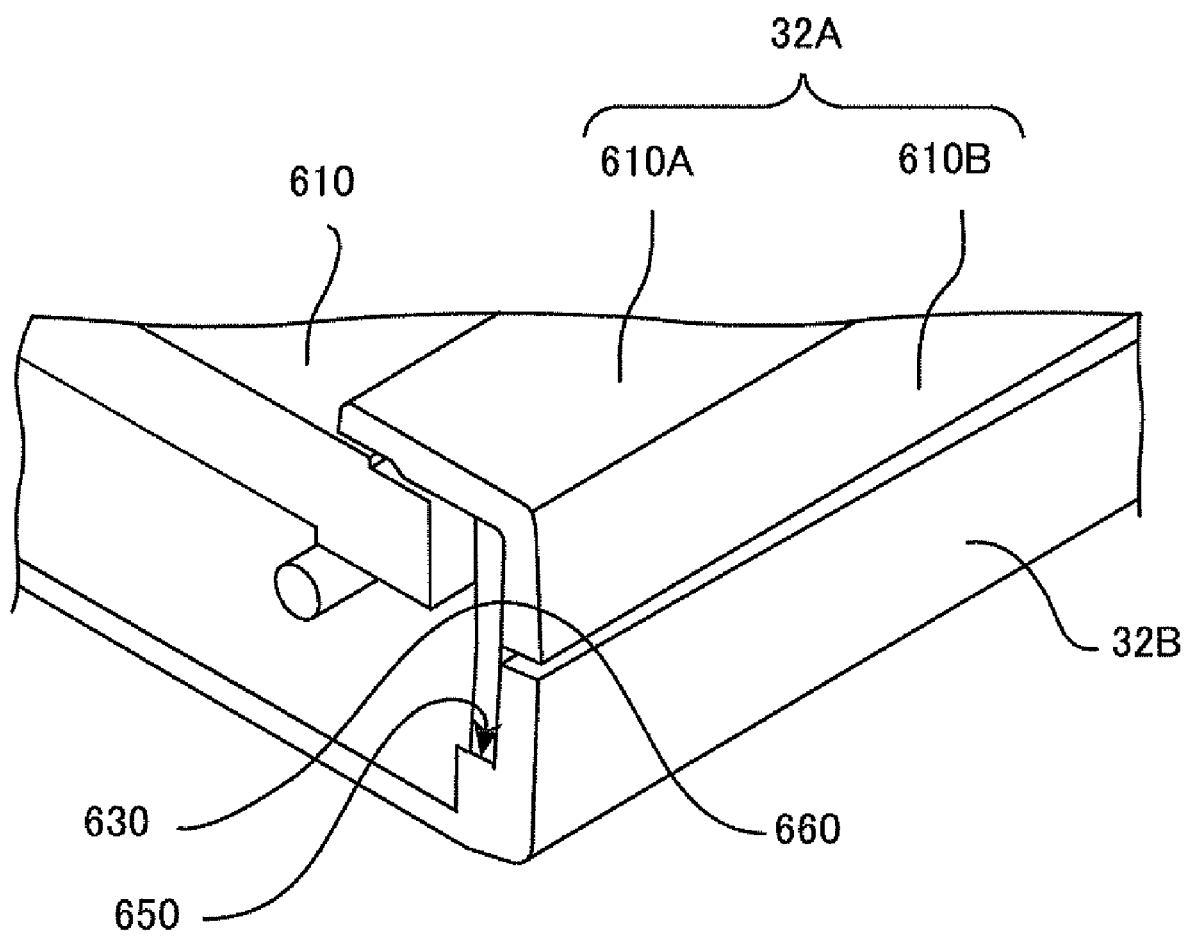
FIG. 36 shows a cross-section of the display unit in a second region where a projection is provided in the front cover.

FIG. 36 shows a cross-section of the display unit 30 in a second region where the projection 630 is provided in the front cover 32A.

In the second region of the display unit 30, shown in FIG. 36, the frame portion 660 of the front cover 32A abuts against the lower step portion of the rear cover 32B, which defines the above-mentioned stepped portion. Further, the projections 650 provided on the front cover 32A on the more inner side than the frame portion 660 are inserted into the dents 650 which are more deeply recessed than the lower step portion in the inner area of the front end surface of the rear cover 32B. As a result, the projections 630 of the front cover 32A comes into the dents 650 of the rear cover 32B, respectively, to be overlapped with the rear cover 32B.

Thus, according to this embodiment, in the first region of the display unit 30 shown in FIG. 35, the front cover 32A and the rear cover 32B are overlapped with each other in the state of the rear cover 32B being located on the inner side. In the second region of the display unit 30, shown in FIG. 36, the front cover 32A and the rear cover 32B are overlapped with each other in the state of the front cover 32A being located on the inner side. Stated another way, the front cover 32A and the rear cover 32B mutually restrict their movements in the direction in which both the covers are overlapped with each other. Therefore, the front cover 32A and the rear cover 32B can be fixedly held without using additional members such as ribs.

Hence, this embodiment can concurrently realize a reduction in size and weight of the personal computer and an increase in size of the display screen.

Figure 37:
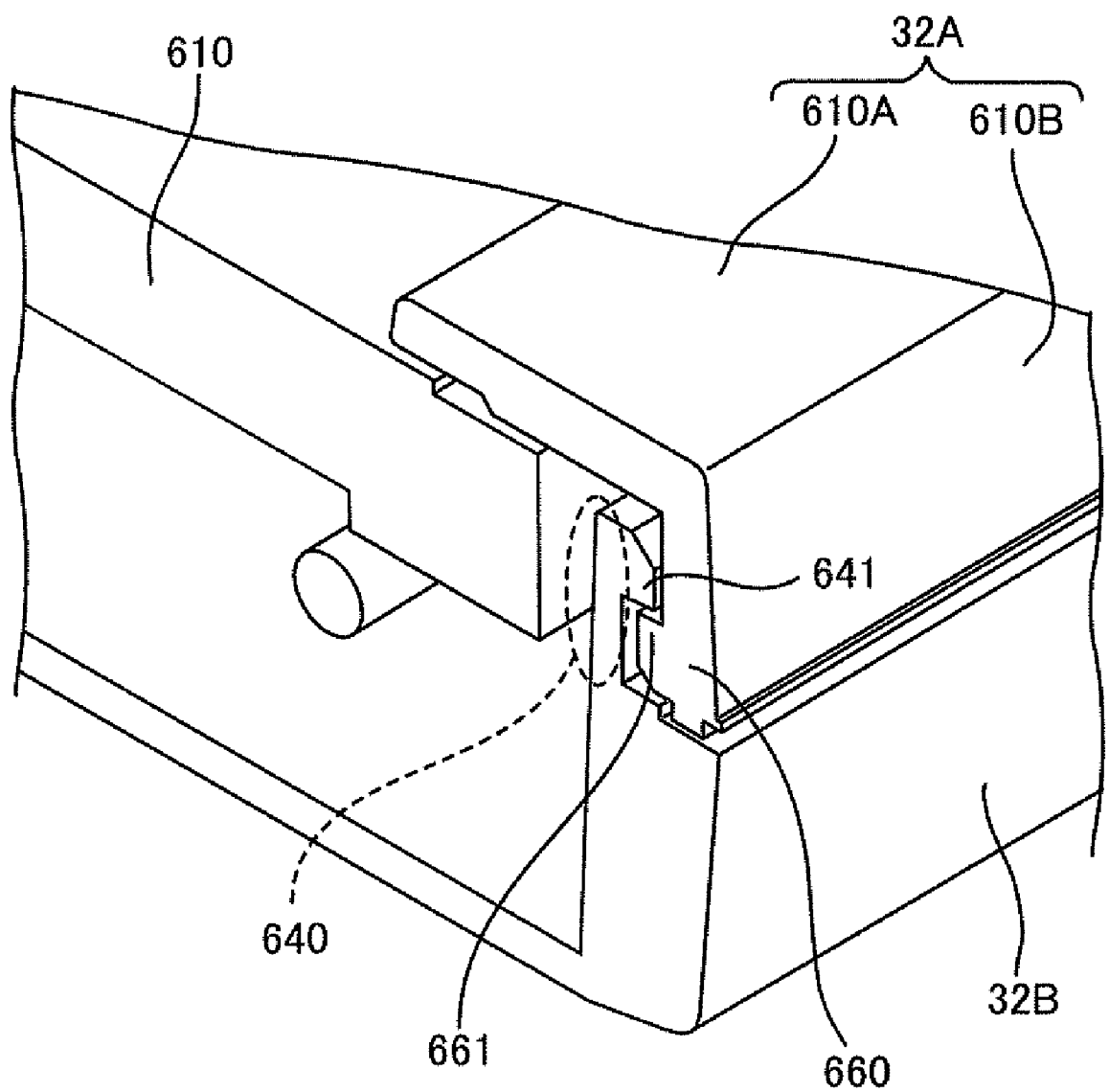
FIG. 37 shows a cross-section of the display unit in a third region where the salient part is provided in the upper step portion of the rear cover.

FIG. 37 shows a cross-section of the display unit 30 in a third region where the salient part 641 is provided in the upper step portion 640 of the rear cover 32B.

As shown in FIG. 37, in the third region of the display unit 30, the upper step portion 640 of the rear cover 32B further has the salient part 641, which projects outwards, in comparison with the upper step portion 640 in the first region shown in FIG. 35. Also, the frame portion 660 of the front cover 32A further has a salient part 661 projecting inwards. The salient parts 641 and 661 are engaged with each such that the front cover 32A and the rear cover 32B are positively fixed together. The salient part 641 of the rear cover 32B corresponds to one example of "one engaging protrusion" in this embodiment. The salient part 661 of the front cover 32A corresponds to one example of the "other engaging protrusion" in this embodiment.

Thus, according to this embodiment, the display housing 32 can be formed to have a narrower portion surrounding the edge of the liquid crystal panel 610. From that point of view as well, this embodiment can concurrently realize a reduction in size and weight of the personal computer and an increase in size of the display screen.

In the foregoing embodiment, a personal computer is described as one example of electronic apparatuses. However, the electronic apparatus may be, for example, a notebook computer, a PDA, a game machine, a TV, or a cell phone.

Also, the embodiment has been described above in connection with the case of using, e.g., a liquid crystal panel as a display panel. However, the display panel is not limited to the liquid crystal panel, and it may be of any other suitable type including a plasma display, a field emission display, or an organic EL display.

Further, the embodiment has been described above in connection with the case where the octagonal holes are formed in the partition plate supporting the keyboard at the positions corresponding respectively to the plurality of keys, respectively. However, the holes formed in the partition plate may have a circular shape. Generally, in keyboards associated with personal computers, keys have a rectangular shape. When the hole formed in the partition plate has an octagonal shape, four of eight edges of the hole are positioned parallel to four sides of the key. For that reason, the octagonal hole is advantageous in maintaining a sufficient strength of the partition plate and in efficiently reducing the weight of the housing of the electronic apparatus.

Still further, the embodiment has been described above in connection with the case where the flexible printed circuit is disposed in the folded state so as to prevent damage of the hard disk. However, the first electronic component called in this embodiment may be a mechanical driven type electronic component other than the hard disk. The mechanical driven type electronic component may be, for example, a portable recording medium drive such as an optical disk drive.

Still further, the embodiment has been described above in connection with the case where the personal computer is connected to the port replicator. However, the function expansion device called so in this embodiment is not limited to the port replicator, and it may be, for example, an expansion station or a docking station including an optical disk drive, an expansion battery, etc., and an external adaptor for adding the communication function to the personal computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic apparatus, comprising:
a battery pack having a groove formed in an outer surface of the battery pack, the groove being recessed from the outer surface and extending in a predetermined direction; and
a main unit comprising a container portion containing the battery pack in a removable manner and having a projection engaged to the groove of the battery pack loaded in the container portion, and a cable disposed in an internal space of the projection.

2. The electronic apparatus according to claim 1, wherein the projection has a concave portion, the concave portion forms the internal space, on a backside of a projecting surface of the projection, the projecting surface being positioned to face the battery pack loaded in the container portion.

3. The electronic apparatus according to claim 2, wherein the main unit further comprises a first electronic component mounted on a surface from which the projection is projected and to which the concave portion is formed, the first electronic component covering the cable disposed in the concave portion.

4. The electronic apparatus according to claim 2, wherein the main unit further comprises a second electronic component mounted on a surface from which the projection is projected and to which the concave portion is formed, and
the cable is connected to the second electronic component.

5. The electronic apparatus according to claim 3, wherein the first electronic component is a keyboard.

6. The electronic apparatus according to claim 4, wherein the second electronic component is a speaker.

7. The electronic apparatus according to claim 1, wherein the battery pack contains a plurality of cells each having a cylindrical shape and adjacently arranged with central axes of the cylindrical cells being parallel to each other, and
the groove is recessed into a space formed between the adjacent cells.

8. A method of containing a battery pack in an electronic apparatus, comprising:
forming a groove in an outer surface of the battery pack;
recessing the groove from the outer surface;
extending the groove in a predetermined direction;
containing the battery pack in a removable manner in a main unit of the apparatus;

engaging a projection to the groove of the battery pack; and disposing a cable in an internal space of the projection.

9. The electronic apparatus according to claim 1, wherein the predetermined direction is different from a recessed direction of the groove, the internal space of the projection extends in the same direction as the predetermined direction of the groove, and the cable extends in the same direction as the extended direction of the internal space.

10. The method of containing a battery pack in an electronic apparatus of claim 8, comprising further:

making the predetermined direction different from a recessed direction of the groove;

extending the internal space of the projection in the predetermined direction of the groove; and extending the cable in the predetermined direction of the internal space.

11. A personal computer, comprising:

a main unit containing a battery pack in a removable manner, a projection engaged with a groove of the battery pack, and a cable disposed in an internal space of the projection;

a display unit rotatably connected to the main unit;

the groove of the battery pack formed in an outer surface of the battery pack, the groove being recessed from the outer surface and extending in a predetermined direction.

* * * * *